US010635738B2

(12) United States Patent
Shultz et al.

(10) Patent No.: US 10,635,738 B2
(45) Date of Patent: Apr. 28, 2020

(54) DEVICE, METHOD, AND GRAPHICAL USER INTERFACE FOR MANAGING WEBSITE PRESENTATION SETTINGS

(71) Applicant: Apple Inc., Cupertino, CA (US)

(72) Inventors: Conrad A. Shultz, San Jose, CA (US); Mateusz K. Rajca, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 11 days.

(21) Appl. No.: 15/978,120

(22) Filed: May 12, 2018

(65) Prior Publication Data

US 2018/0373803 A1 Dec. 27, 2018

Related U.S. Application Data

(60) Provisional application No. 62/506,685, filed on May 16, 2017.

(51) Int. Cl.

| G06F 17/00 | (2019.01) |
|---|---|
| G06F 16/957 | (2019.01) |
| G06F 3/0482 | (2013.01) |
| G06F 3/0484 | (2013.01) |
| G06F 16/958 | (2019.01) |
| G06F 3/0488 | (2013.01) |
| G06F 3/0483 | (2013.01) |

(52) U.S. Cl.
CPC ........ *G06F 16/9577* (2019.01); *G06F 3/0482* (2013.01); *G06F 3/0483* (2013.01); *G06F 3/04842* (2013.01); *G06F 3/04883* (2013.01); *G06F 16/958* (2019.01)

(58) Field of Classification Search
CPC ... G06F 16/9577; G06F 16/958; G06F 3/0482
See application file for complete search history.

(56) References Cited

U.S. PATENT DOCUMENTS

| 2004/0049541 A1* | 3/2004 | Swahn | G06F 3/04817 709/203 |
|---|---|---|---|
| 2013/0212464 A1* | 8/2013 | Kimura | G06F 3/1206 715/234 |
| 2013/0219259 A1* | 8/2013 | Wilhelm | G06F 16/954 715/234 |

(Continued)

*Primary Examiner* — Scott T Baderman
*Assistant Examiner* — Barbara M Level
(74) *Attorney, Agent, or Firm* — Fernando & Partners, LLP

(57) ABSTRACT

An electronic device: displays a website settings interface provided to edit a plurality of a presentation settings for at least one website among a plurality of websites within a web browsing application, including concurrently displaying: a first website representation and a user-modifiable control for selecting a first value for a presentation setting for the associated website; and a second website representation and a user-modifiable control for selecting a second value for the presentation setting for the associated website, where the second value is not associated with a previously received user preference and the second value is set according to a predetermined value for the presentation setting; and in response to detecting an input that ceases display of a website associated with the second website representation, ceases to display include the second website representation within the website settings interface.

20 Claims, 34 Drawing Sheets

(56) References Cited

U.S. PATENT DOCUMENTS

2015/0347612 A1* 12/2015 Matsumoto ............. H04L 67/22
715/234
2016/0148006 A1* 5/2016 Ganapathi ............... G06F 21/62
726/30

* cited by examiner

700

At a device with one or more processors, non-transitory memory, a display, and one or more input devices: ⟵ 702

While displaying a plurality of websites within a web browsing application, display, on the display, a website settings interface provided to edit a plurality of a presentation settings for at least one website of the plurality of websites, including concurrently displaying:

A first representation of a first website of the plurality websites and a first user-modifiable control for selecting a first value for a first presentation setting for the first website; and A second representation of a second website of the plurality websites and a second user-modifiable control for selecting a second value for the first presentation setting for the second website, where the second value for the first presentation setting for the second website is not associated with a previously received user preference and the second value for the first presentation setting for the second website is set according to a predetermined value for the first presentation setting > The first value for the first presentation setting for the first website is set according to a value configured by a user of the device; and ⟵ 704
>
> The first website does not correspond to one of the plurality of websites within the web browsing application
>
> > The first value for the first presentation setting for the first website is different from the predetermined value for the first presentation setting for the second website ⟵ 706

> The website settings interface further includes an additional user-modifiable control for selecting the predetermined value for the first presentation setting ⟵ 708

> The website settings interface further includes a removal affordance for removing a configured value for the first presentation setting for a website ⟵ 710

802 — At a device with one or more processors, non-transitory memory, a display, and one or more input devices:

Prior to presenting media content associated with a website, determine one or more presentation settings for presenting the media content based on a function of previous local user interaction data indicative of local user presentation preferences for the one or more presentation settings for the website and aggregate user interaction data indicative of aggregate presentation preferences for the one or more presentation settings for the website

804 — The previous local user interaction data indicative of the local user presentation preferences for the one or more presentation settings for the website overrides the aggregate user interaction data indicative of the aggregate presentation preferences for the one or more presentation settings for the website

806 — The aggregate user interaction data indicative of the aggregate presentation preferences for the one or more presentation settings for the website overrides one or more default presentation settings for the one or more presentation settings

808 — Determining the one or more presentation settings for presenting the media content includes determining the one or more presentation settings for presenting the media content in response to receiving a request to visit the website

810 — Determining the one or more presentation settings for presenting the media content includes determining the one or more presentation settings for presenting the media content in response to obtaining the media content as an update associated with the website

812 — The one or more presentation settings correspond to one of a media auto-play setting, a reader mode setting, or a content blocker setting (A)

822 — Display, on the display, the website and presenting the media content based on the determination of the one or more presentation settings 824 — Presenting the media content based on the determination of the one or more presentation settings includes:

In accordance with a determination that the media content is auto-playing media content and that the function of the previous local user interaction data indicative of the local user presentation preferences for the one or more presentation settings for the website and the aggregate user interaction data indicative of the aggregate presentation preferences for the one or more presentation settings for the website indicates a preference for allowing auto-play of the media content, auto-playing the media content; and In accordance with a determination that the media content is auto-playing media content and that the function of the previous local user interaction data indicative of the local user presentation preferences for the one or more presentation settings for the website and the aggregate user interaction data indicative of the aggregate presentation preferences for the one or more presentation settings for the website indicates a preference for preventing auto-play of the media content, forgoing auto-playing the media content 826 — Presenting the media content based on the determination of the one or more presentation settings includes:

In accordance with a determination that the media content is not marked by the website as auto-playing media content and that the function of the previous local user interaction data indicative of the local user presentation preferences for the one or more presentation settings for the website and the aggregate user interaction data indicative of the aggregate presentation preferences for the one or more presentation settings for the website indicates a preference for playing the media content, auto-playing the media content; and In accordance with a determination that the media content is not marked by the website as auto-playing media content and that the function of the previous local user interaction data indicative of the local user presentation preferences for the one or more presentation settings for the website and the aggregate user interaction data indicative of the aggregate presentation preferences for the one or more presentation settings for the website indicates a preference for not playing the media content, forgoing auto-playing the media content

DEVICE, METHOD, AND GRAPHICAL USER INTERFACE FOR MANAGING WEBSITE PRESENTATION SETTINGS

RELATED APPLICATION

This application claims priority to U.S. Provisional Patent Application No. 62/506,685, filed on May 16, 2017, entitled "Device, Method, and Graphical User Interface for Managing Website Presentation Settings," the entire contents of which are incorporated herein by reference.

TECHNICAL FIELD

This relates generally to electronic devices with touch-sensitive surfaces, including but not limited to electronic devices with touch-sensitive surfaces that manage website presentation settings.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for managing website presentation settings and presenting websites therefrom. Such methods and interfaces optionally complement or replace conventional methods for managing website presentation settings and presenting websites therefrom. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and one or more input devices. The method includes: while displaying a plurality of websites within a web browsing application, displaying, on the display, a website settings interface provided to edit a plurality of a presentation settings for at least one website of the plurality of websites, including concurrently displaying: a first representation of a first website of the plurality of websites and a first user-modifiable control for selecting a first value for a first presentation setting for the first website; and a second representation of a second web site of the plurality of web sites and a second user-modifiable control for selecting a second value for the first presentation setting for the second website, where the second value for the first presentation setting for the second website is not associated with a previously received user preference and the second value for the first presentation setting for the second website is set according to a predetermined value for the first presentation setting. In response to detecting a first input that ceases display of the second website within the web browsing application, the method also includes displaying, on the display, the website settings interface, where the website settings interface includes the first representation of the first web site and does not include the second representation of the second website.

In accordance with some embodiments, a method is performed at a device with one or more processors, non-transitory memory, a display, and one or more input devices. Prior to presenting media content associated with a website, the method includes determining one or more presentation for presenting the media content based on a function of previous local user interaction data indicative of local user presentation preferences for the one or more presentation settings for the website and aggregate user interaction data indicative of aggregate presentation preferences for the one or more presentation settings for the website. The method also includes displaying, on the display, the website and presenting the media content based on the determination of the one or more presentation settings.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for managing website presentation settings and presenting websites therefrom, thereby increasing the effectiveness, efficiency, and user satisfaction with such devices. Such methods and interfaces may complement or replace conventional methods for managing website presentation settings and presenting web sites therefrom.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7C illustrate a flow diagram of a method of modifying presentation settings within a website settings interface in accordance with some embodiments.

FIGS. 8A-8D illustrate a flow diagram of a method of presenting a website and associated media content according to determined presentation settings in accordance with some embodiments.

DESCRIPTION OF EMBODIMENTS

Web browser applications typically include a settings menu for adjusting various settings such as appearance (e.g., font, font size, zoom, etc.), extensions, plugins, security, privacy, passwords, autofill, downloads, networking, and/or the like. However, such settings menus are typically neither intuitive nor user-friendly as they lack contextual information. Accordingly, in embodiments described below, a website settings interface for modifying presentation settings for websites is dynamically updated based on currently open websites/tabs and/or previously configured websites in order to provide a more seamless and intuitive user experience when modifying presentation settings for websites. This also reduces power usage and improves battery life of the device by enabling the user to use the device more quickly and efficiently.

The web browsing experience of a user may be adversely affected by media content that auto-plays upon visiting an associated website. Accordingly, in embodiments described below, prior to presenting a website and associated media content, the presentation settings (e.g., media auto-play, reader-mode, and/or content block presentation settings) are determined based on a function of user preferences, aggregate preferences, and/or default preferences in order to provide a more seamless and customized user experience when presenting websites and associated media content. This also reduces power usage and improves battery life of the device by enabling the user to use the device more quickly and efficiently.

Figure 5A:
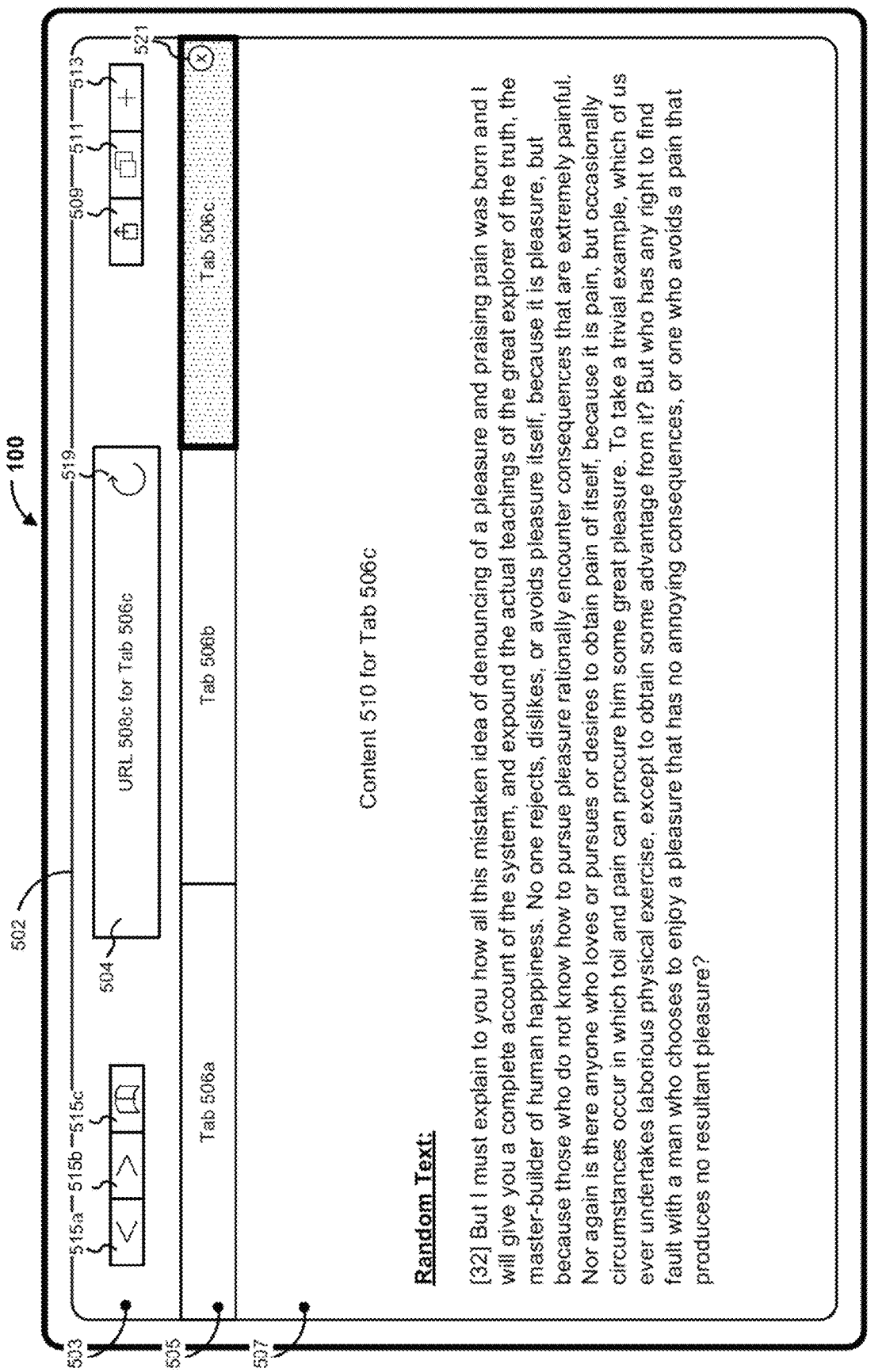
FIGS. 5A-5Q illustrate example user interfaces for modifying presentation settings within a website settings interface in accordance with some embodiments.
Figure 6A:
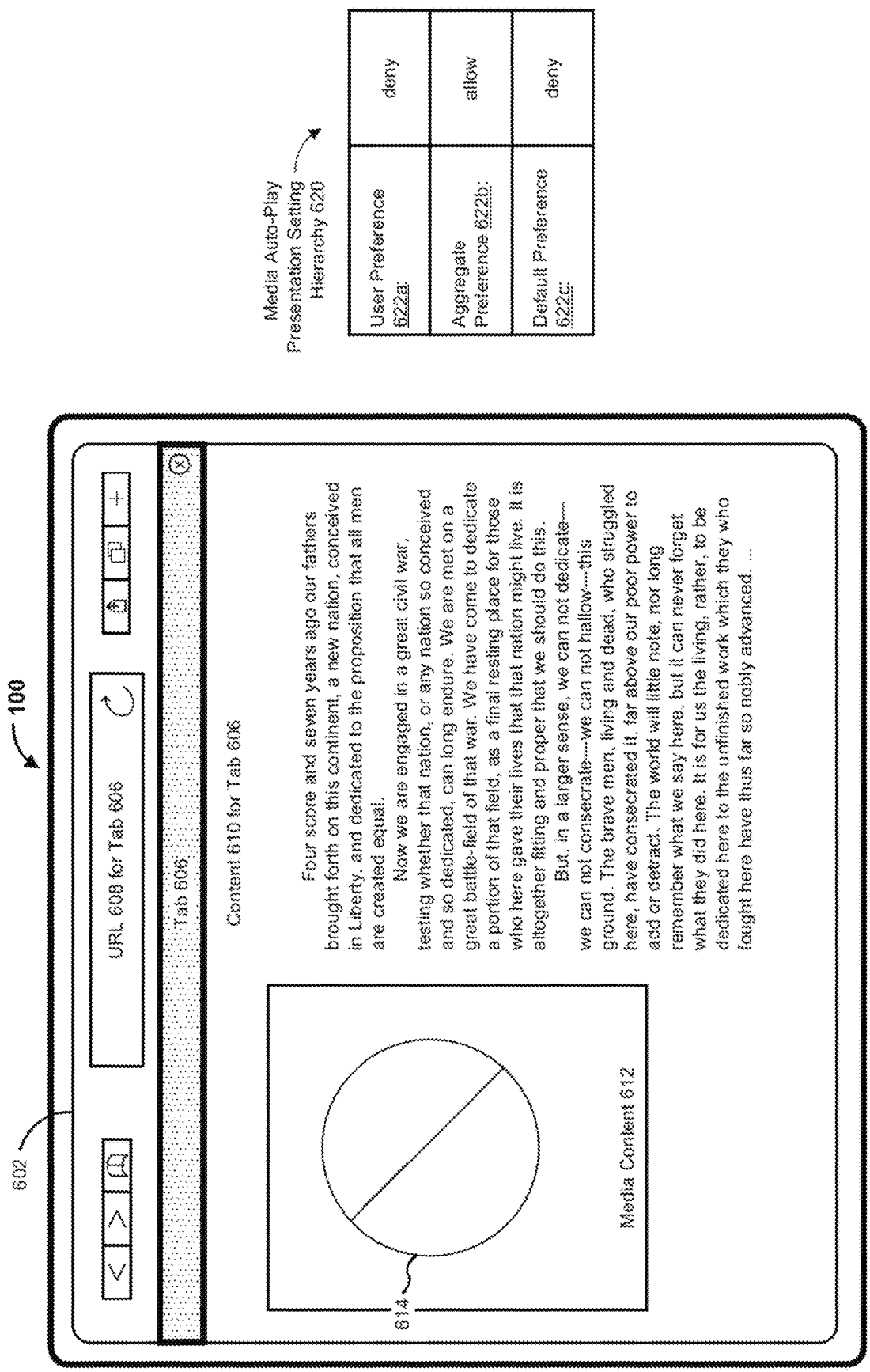
FIGS. 6A-6C illustrate example user interfaces for presenting a website and associated media content according to determined presentation settings in accordance with some embodiments.
Figure 6B:
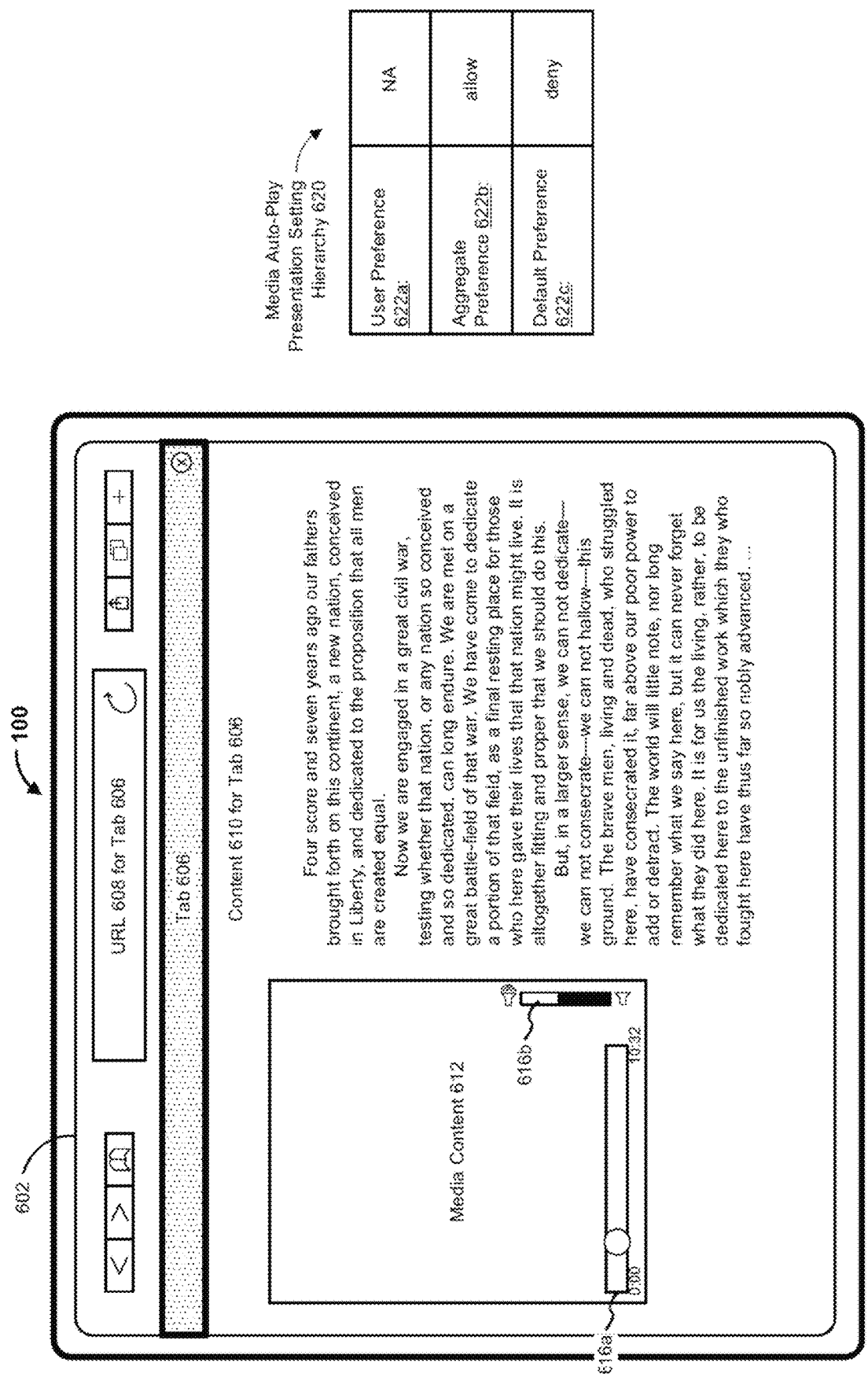
Figure 6C:
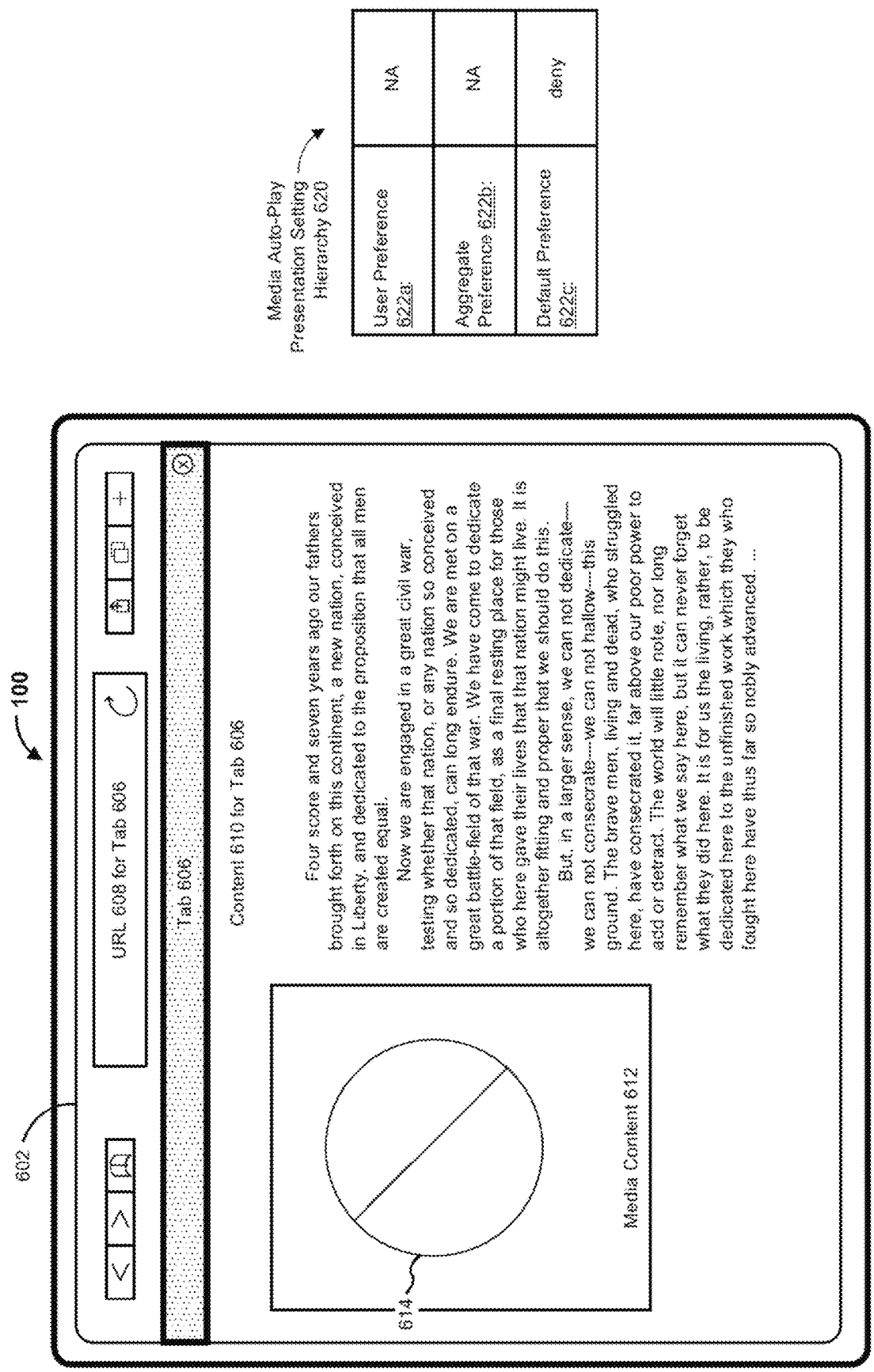
Figure 7B:
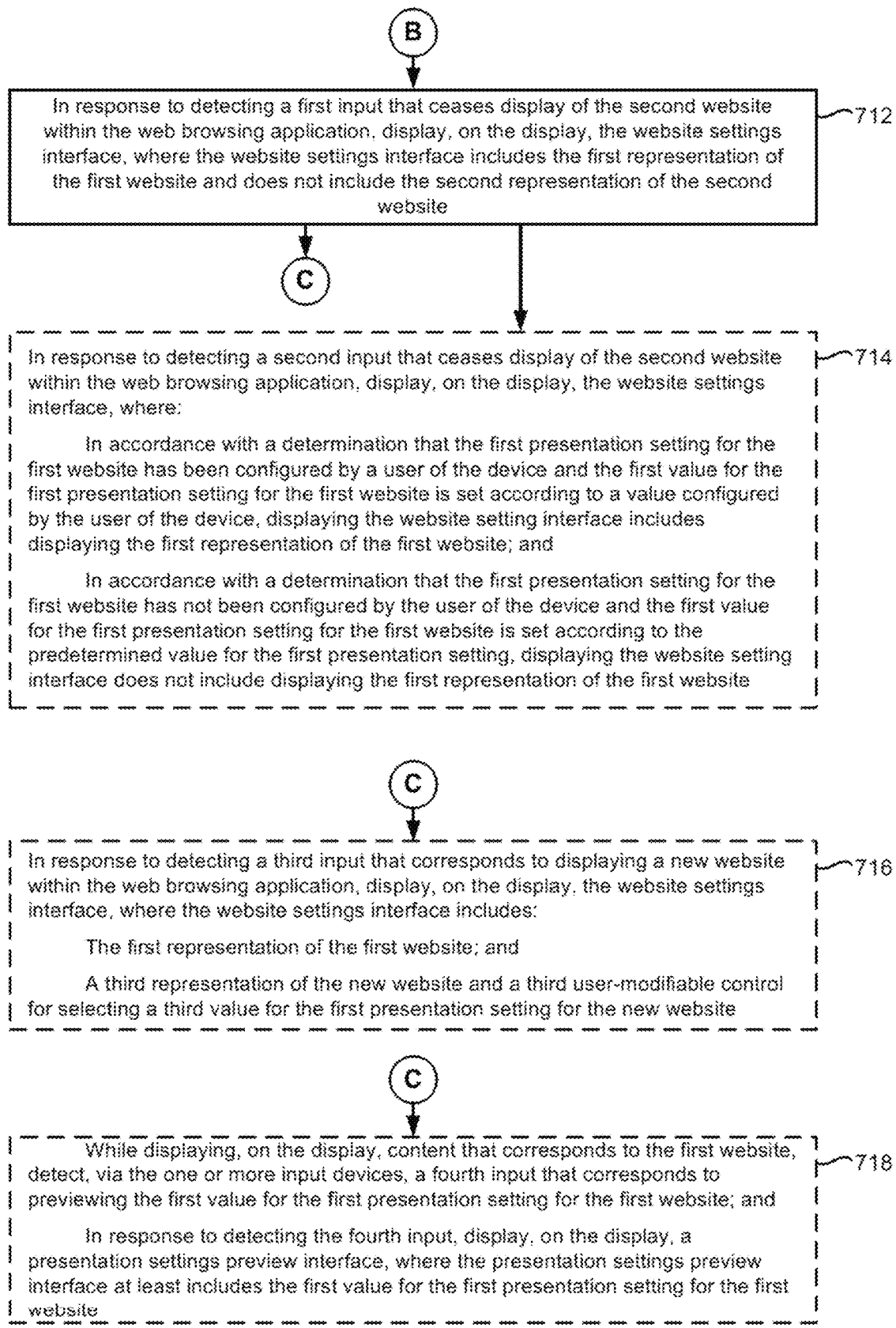
Figure 7C:
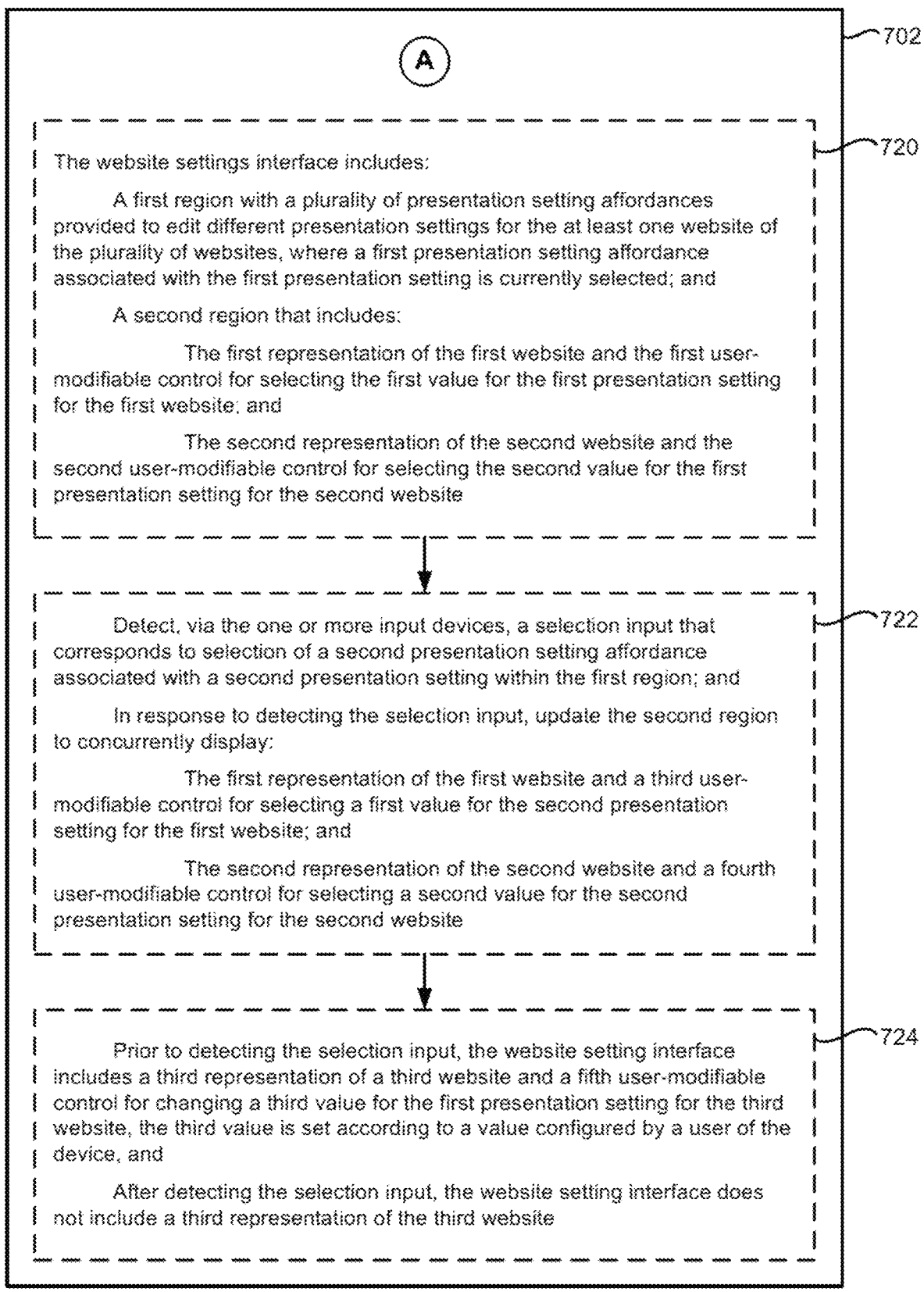
Figure 8B:
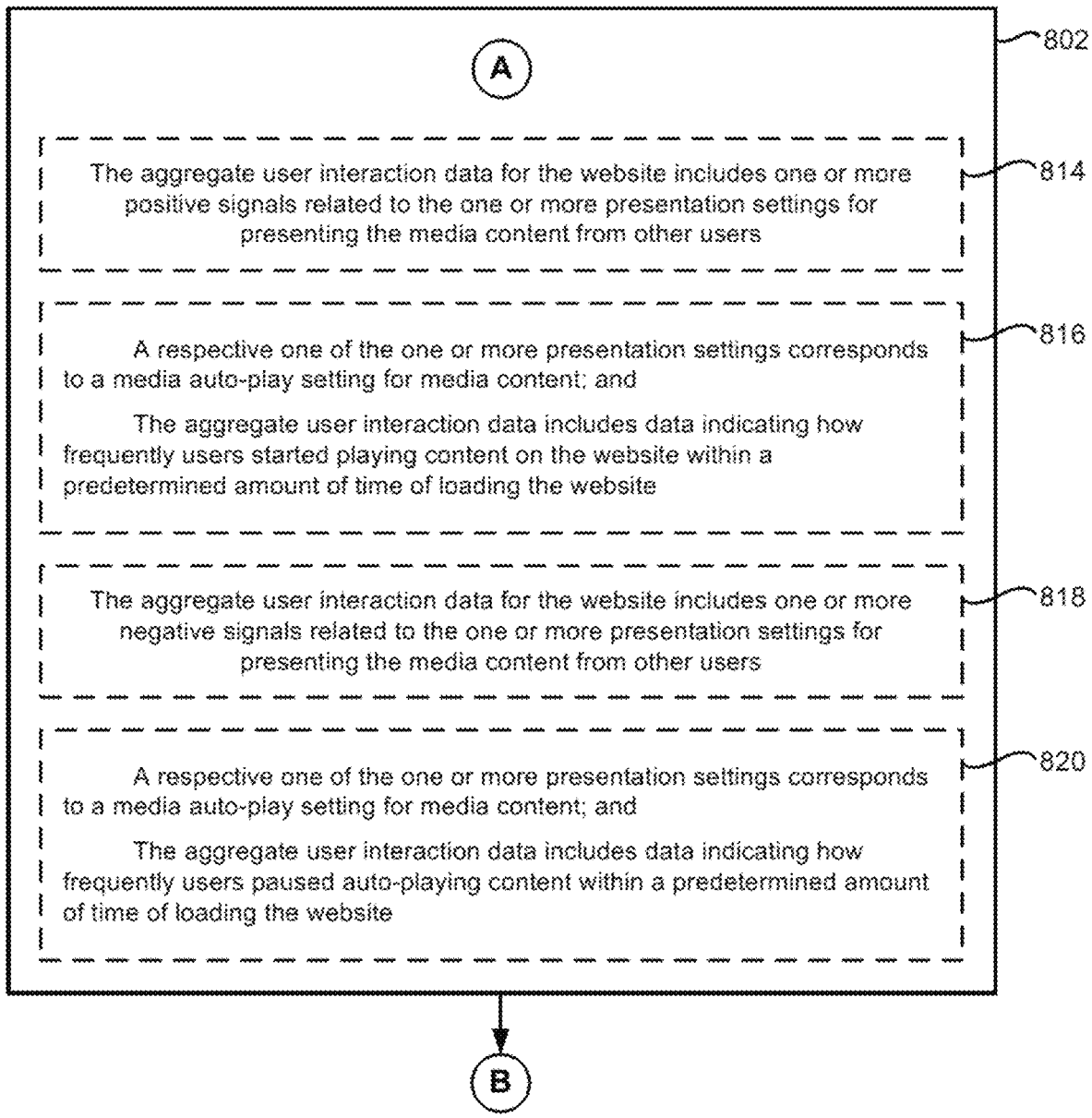
Figure 8D:
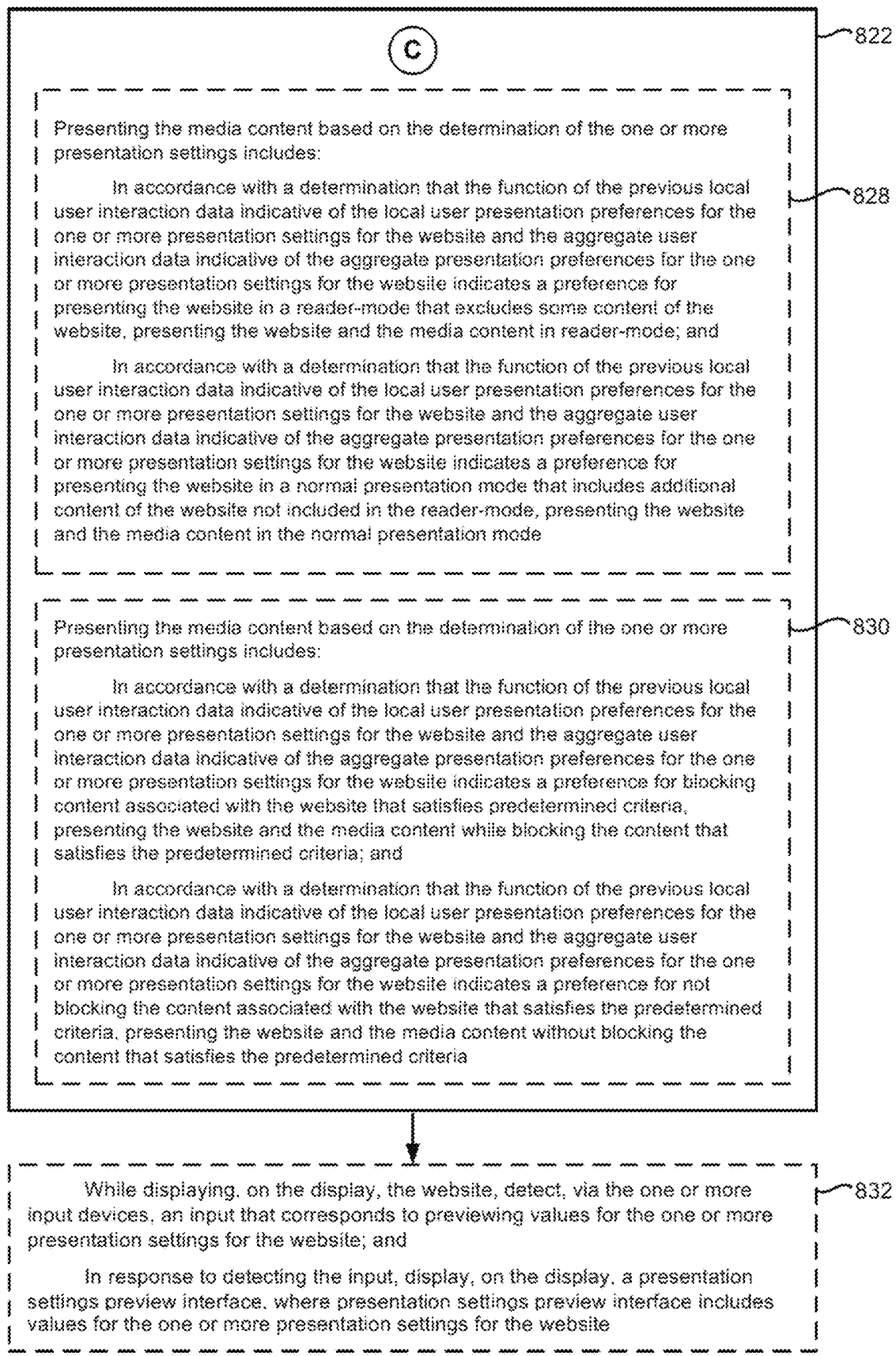
Figure 9:
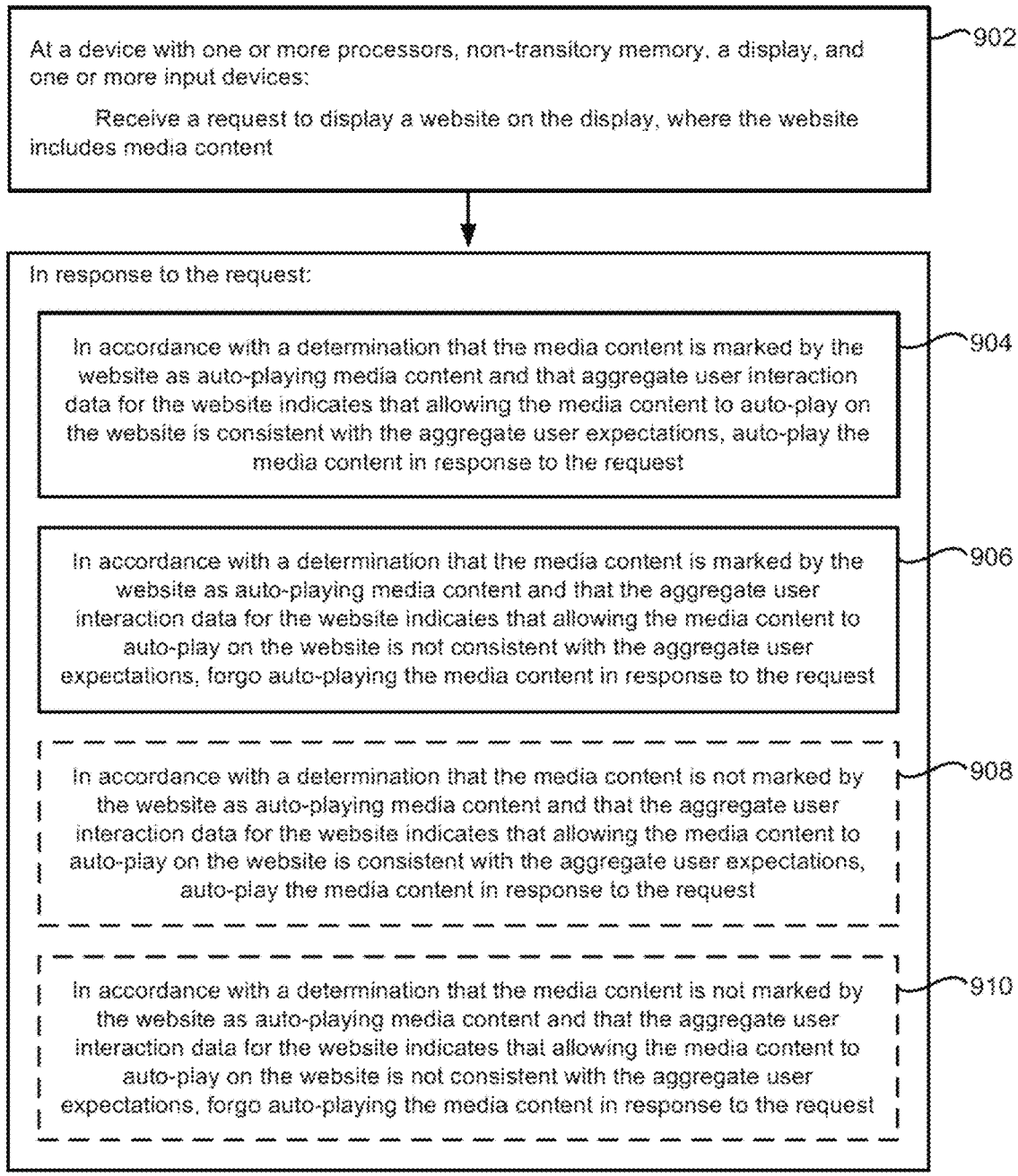
FIG. 9 illustrates a flow diagram of a method of auto-playing media content according to aggregate user expectations in accordance with some embodiments.

Below, FIGS. 1A-1B, 2-3, and 4A-4B provide a description of example devices. FIGS. 7A-7C illustrate a flow diagram of a method of modifying presentation settings within a website settings interface. The user interfaces in FIGS. 5A-5Q are used to illustrate the process in FIGS. 7A-7C. FIGS. 8A-8D illustrate a flow diagram of a method of presenting a website and associated media content according to determined presentation settings. Similarly, FIG. 9 illustrates a flow diagram of a method of auto-playing media content according to aggregate user expectations. The user interfaces in FIGS. 6A-6C are used to illustrate the processes in FIGS. 8A-8D and FIG. 9.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
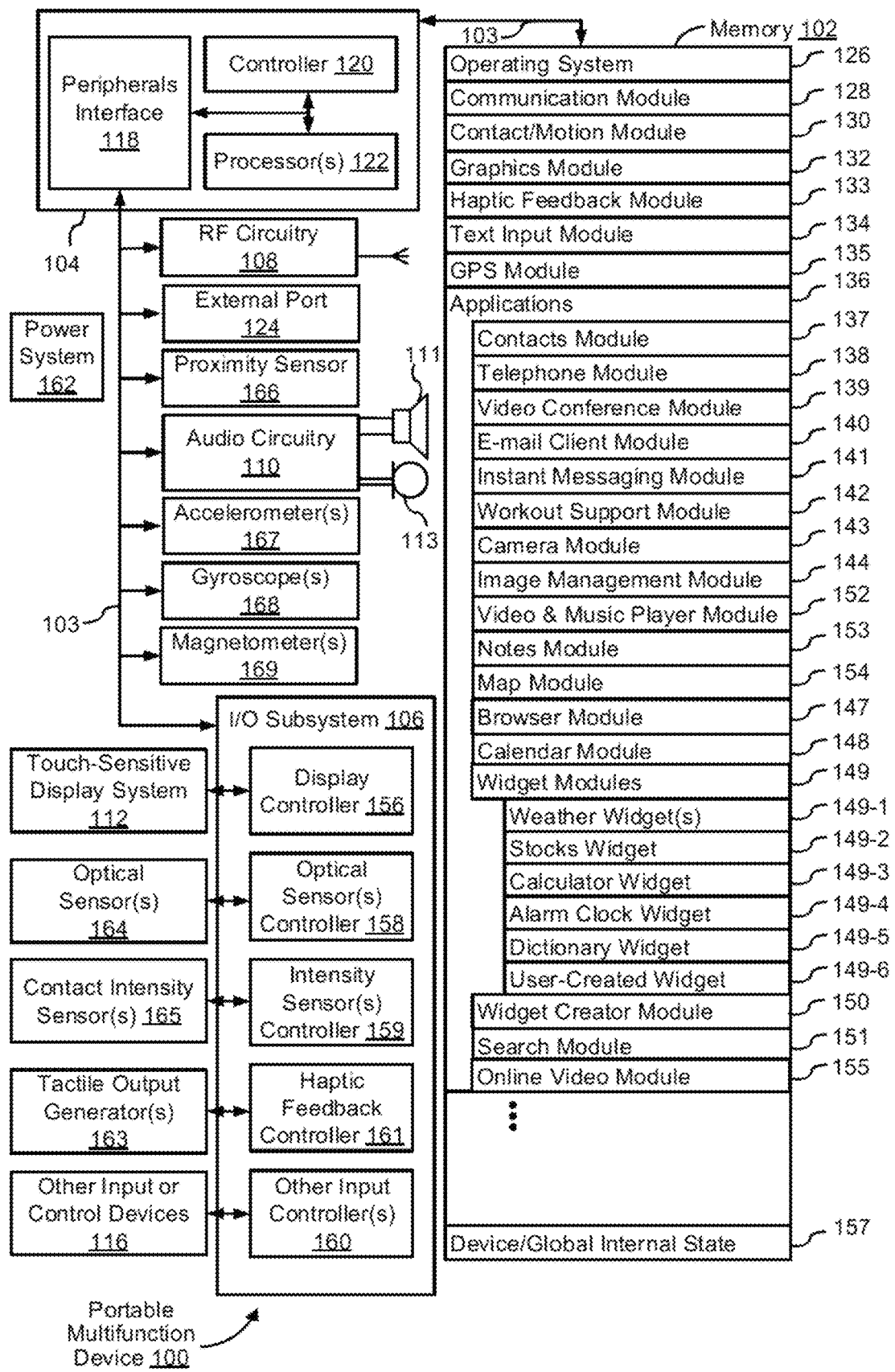
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
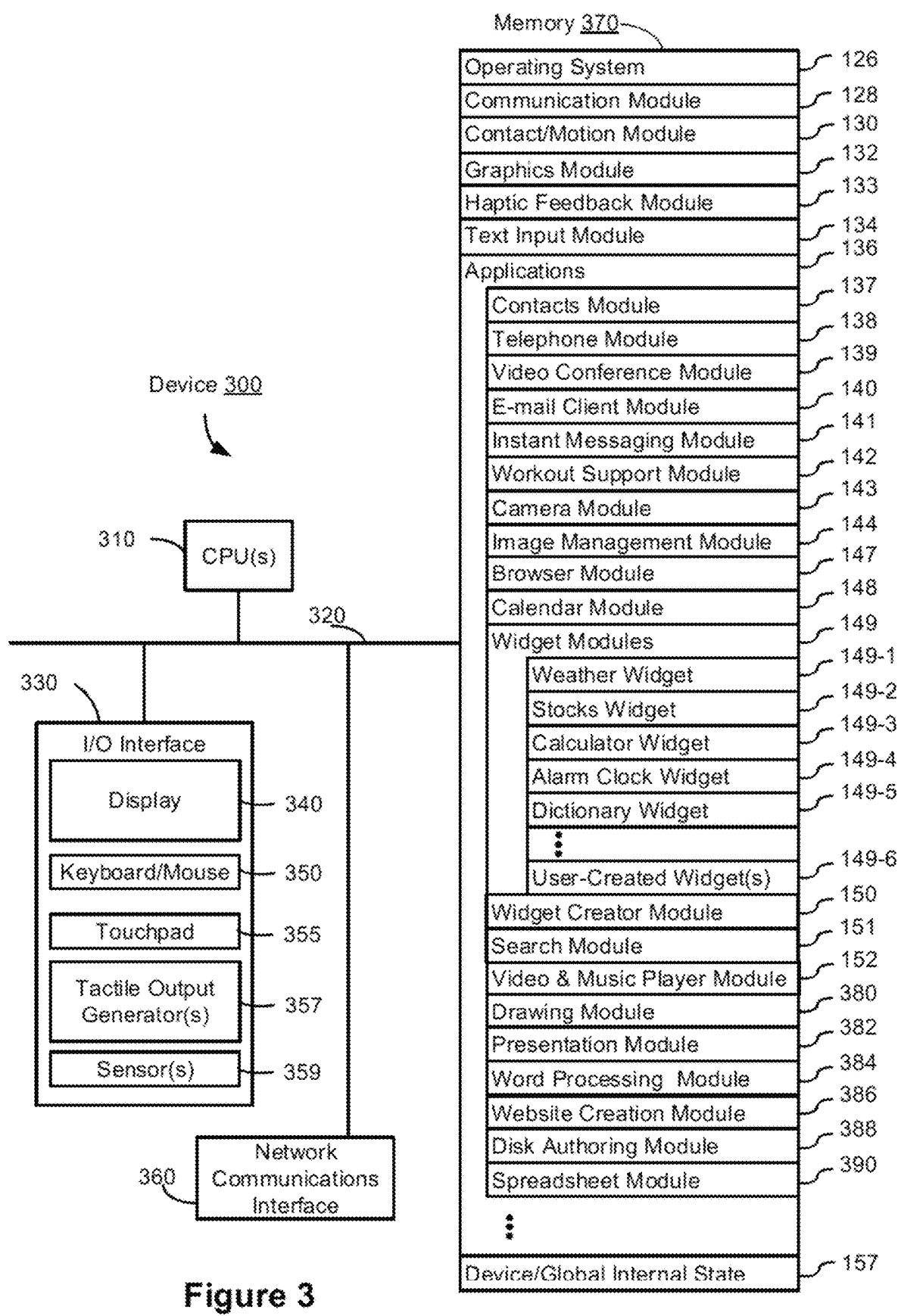
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
    contacts module 137 (sometimes called an address book or contact list);
    telephone module 138;
    video conferencing module 139;
    e-mail client module 140;
    instant messaging (IM) module 141;
    workout support module 142;

camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
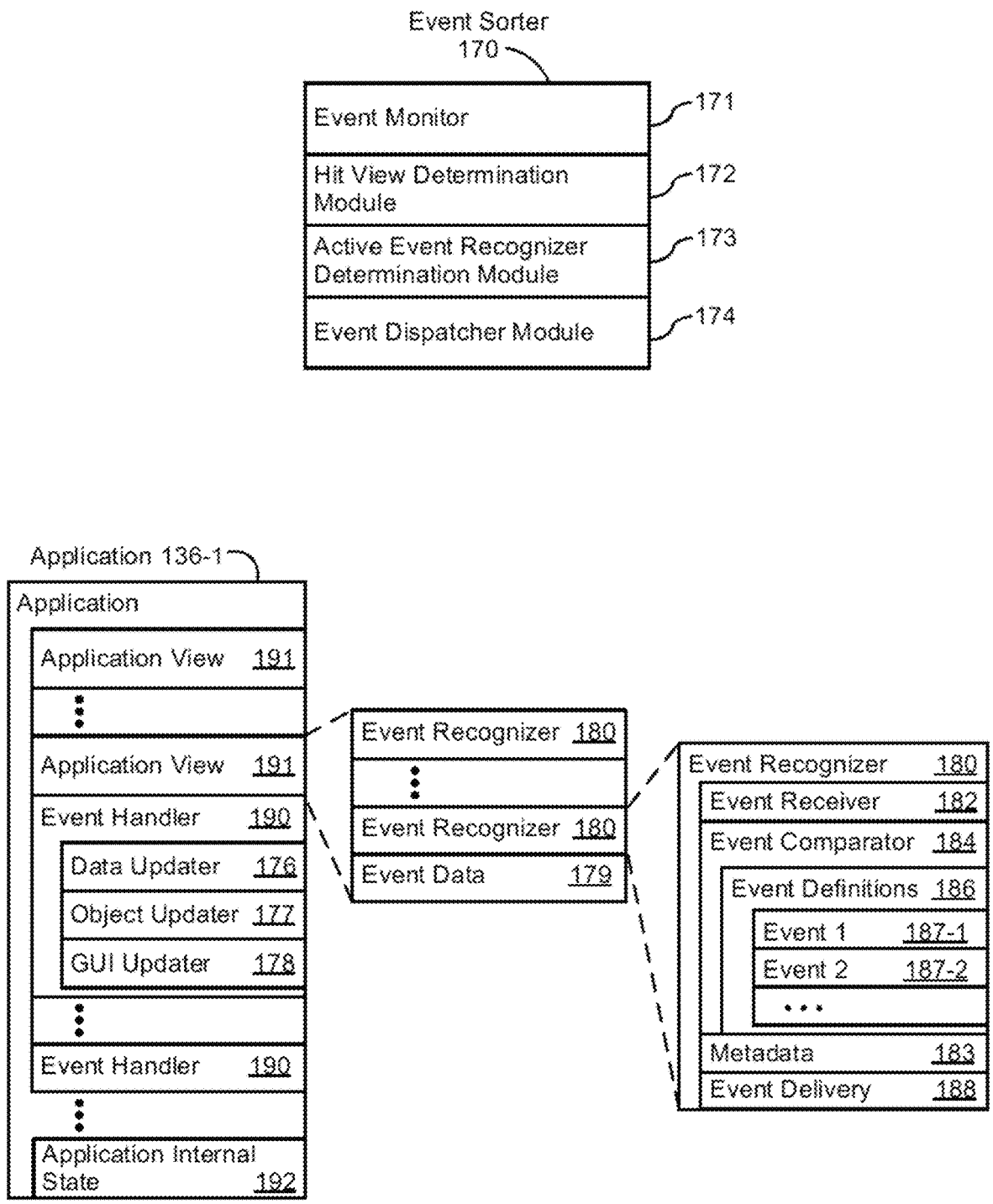
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
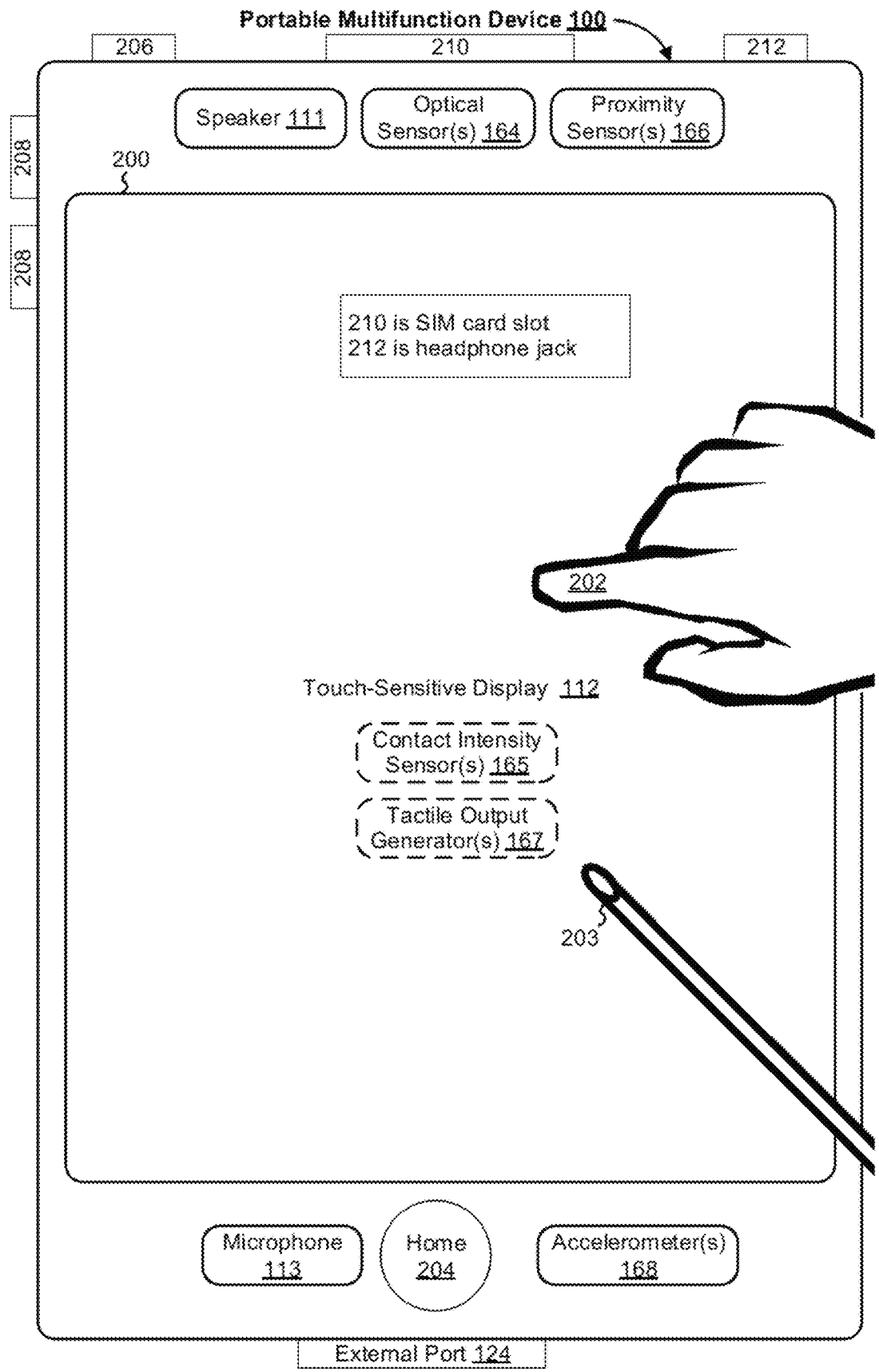
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
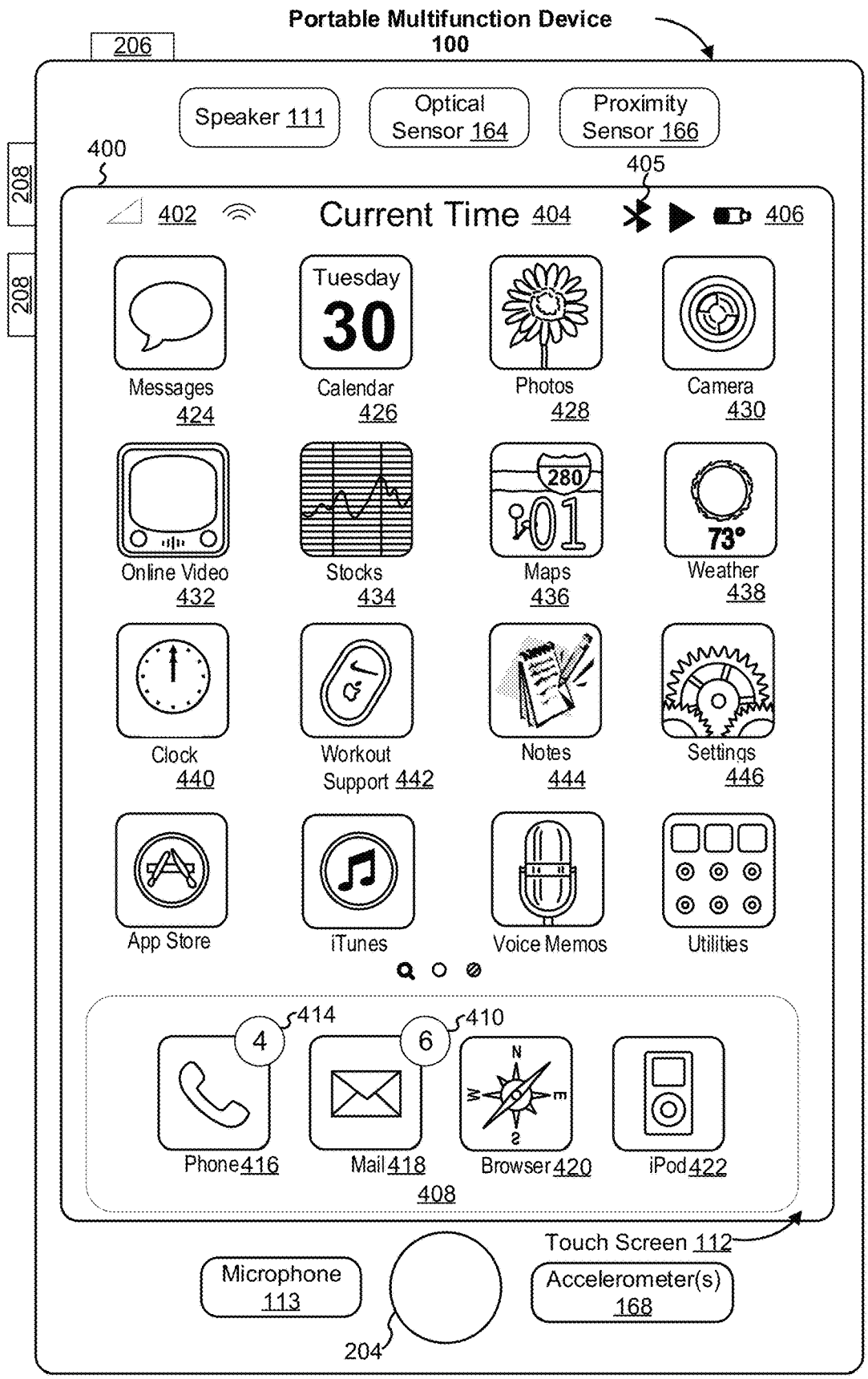
FIG. 4A illustrates an example user interface for a menu of applications on a portable multifunction device in accordance with some embodiments.
Figure 5B:
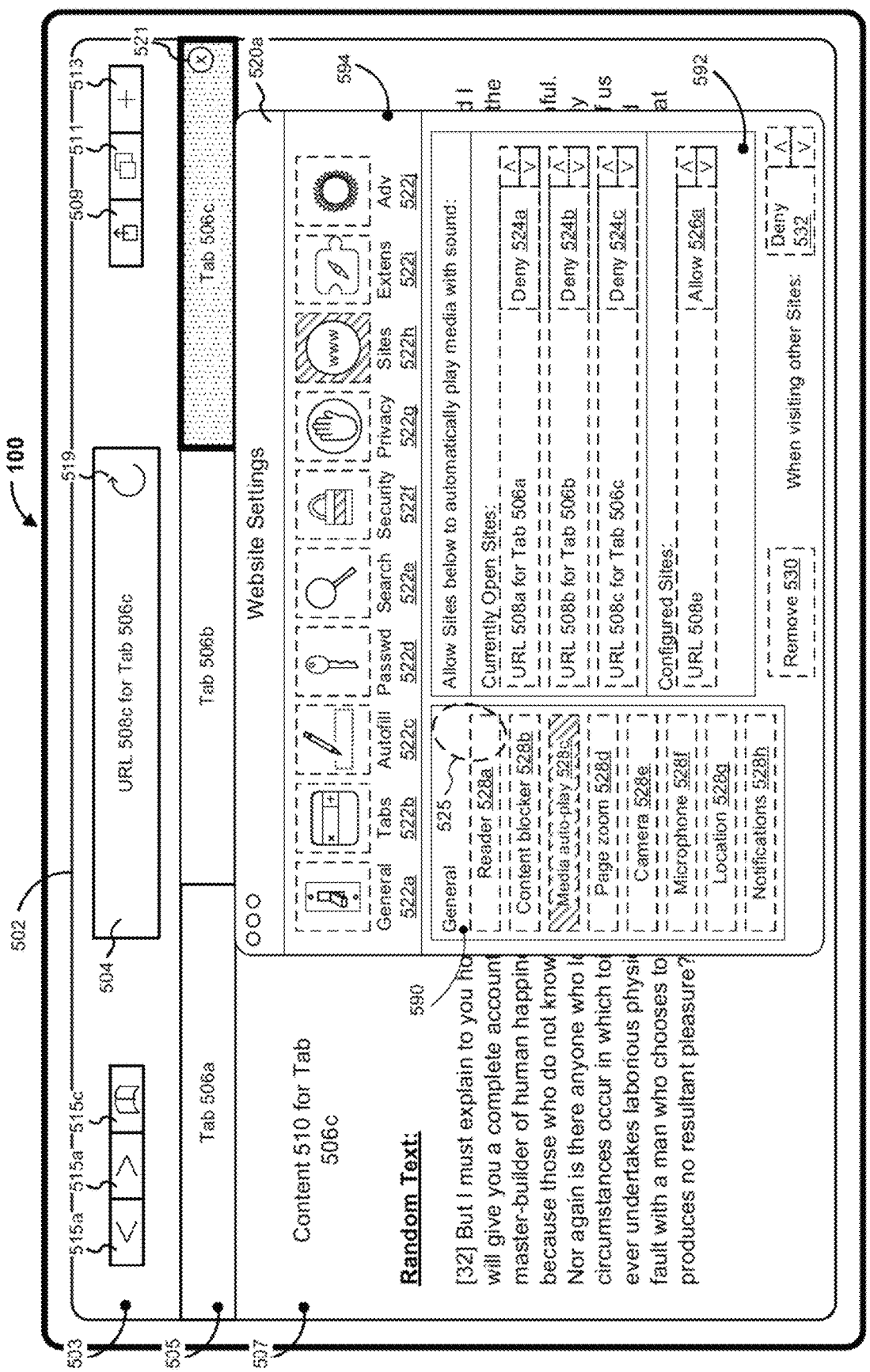

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
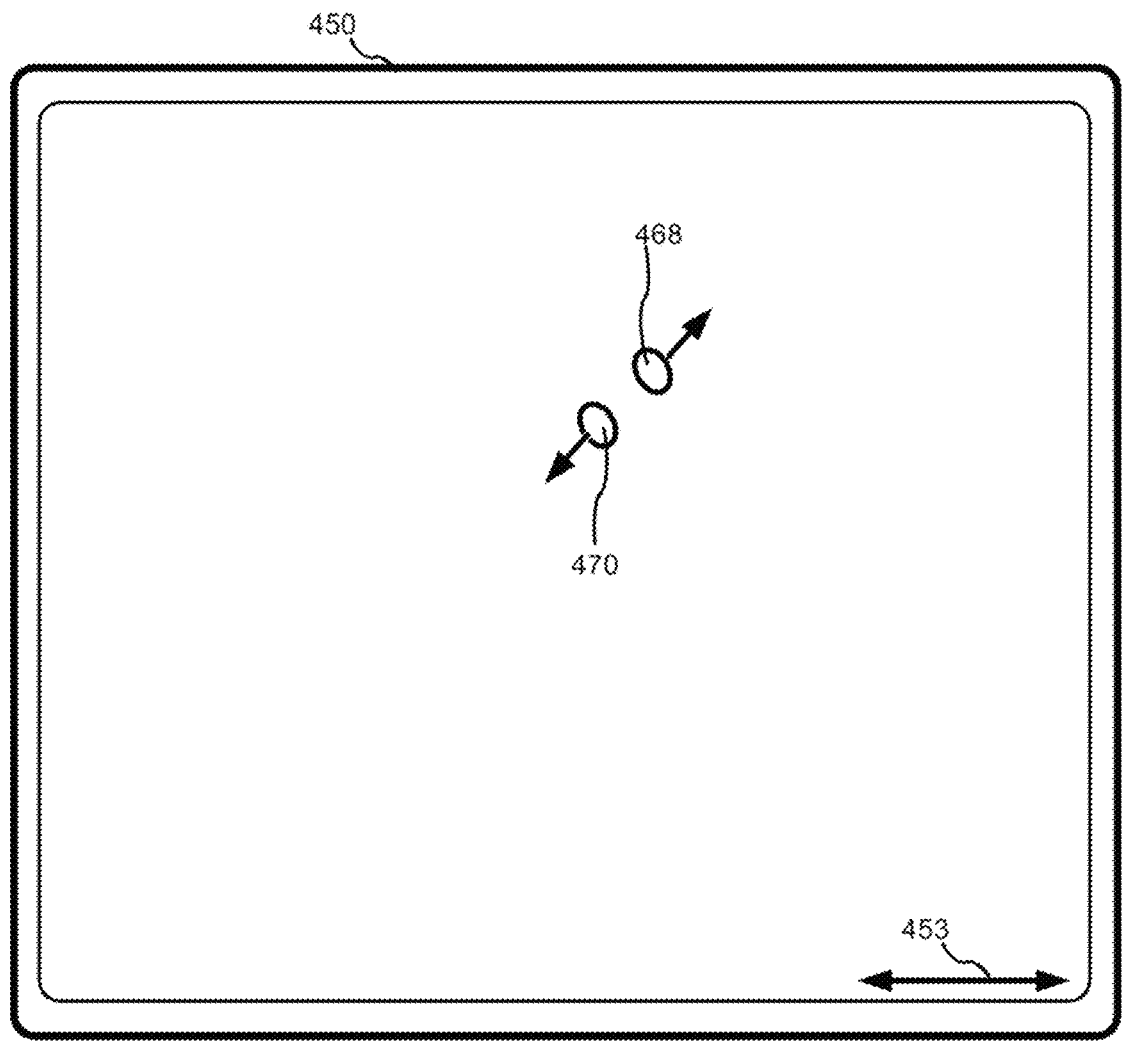
FIG. 4B illustrates an example user interface for a multifunction device with a touch-sensitive surface that is separate from the display in accordance with some embodiments.
Figure 4B:
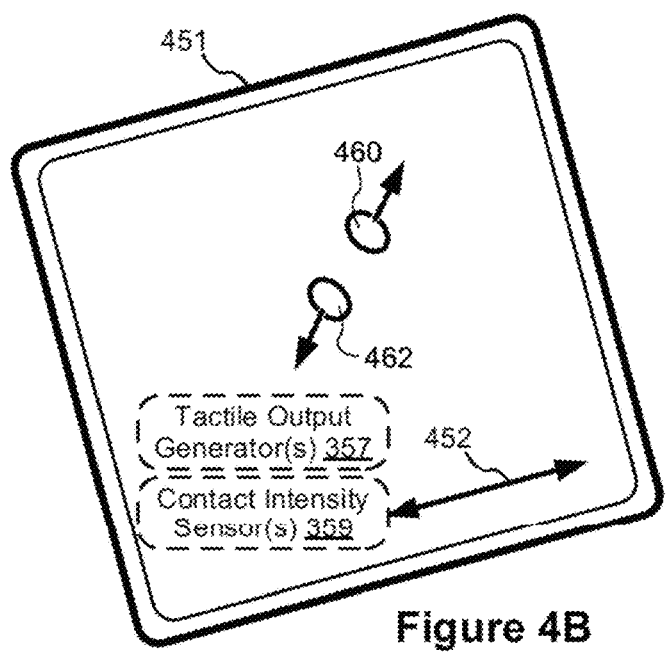

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and one or more input devices.

FIGS. 5A-5Q illustrate example user interfaces for modifying presentation settings within a website settings interface in accordance with some embodiments. The user interfaces in these figures are used to illustrate the processes described below, including the process in FIGS. 7A-7C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates displaying a web browser interface 502 associated with a web browser application executed by the device 100. As shown in FIG. 5A, the web browser interface 502 includes a toolbar region 503, a tab bar region 505, and a content region 507. In FIG. 5A, the toolbar region 503 includes a back affordance 515a provided to display a previous web page in response to selection thereof (e.g., with a contact), a next affordance 515b provided to display a next web page in response to selection thereof, and a book mark affordance 515c provided to replace display of the web browser interface 502 with a bookmark management interface in response to selection thereof.

In FIG. 5A, the toolbar region 503 also includes an address bar 504 displaying URL 508c for tab 506c and a refresh affordance 519 provided to refresh/reload the current web page in response to selection thereof (e.g., with a contact). In FIG. 5A, the toolbar region 503 further includes a sharing affordance 509 provided to display a transport interface over the web browser interface 502 in response to selection thereof (e.g., with a contact), a tab view affordance 511 provided to replace display of the web browser interface 502 with a tab management interface in response to selection thereof, and an add tab affordance 513 provided to add a tab to the web browser interface 502 in response to selection thereof (e.g., as shown in FIGS. 5K-5L).

In FIG. 5A, the tab bar region 505 includes a plurality of user-selectable tabs 506a, 506b, and 506c (sometimes collectively referred to herein as the "tabs 506") provided to display associated content within the content region 507 in response to selection thereof (e.g., with a contact). As shown in FIG. 5A, the tab 506c is currently selected, and the content region 507 includes content 510 for the tab 506c. In FIG. 5A, the device 100 displays an affordance 521 (e.g., the close affordance) proximate to the tab 506c, which, when activated (e.g., selected with a contact), cause the web browser application to close the tabs 506c.

As one example, the device 100 displays a website setting interface overlaid on the web browser interface 502 in response to detecting a user input selecting a first affordance within a toolbar of the web browsing application (e.g., file, preferences, etc.), which displays a drop-down menu, followed by a detecting a subsequent user input selecting a settings affordance within the drop-down menu. As another example, the device 100 displays a website setting interface overlaid on the web browser interface 502 in response to detecting a user input selecting a website options affordance within a control panel or OS settings panel. As yet another example, the device 100 displays a website setting interface overlaid on the web browser interface 502 in response to detecting a predefined key combination, voice command, gesture, and/or the like.

For example, the device 100 detects a request to display the website settings interface such as one of the examples described above. FIG. 5B illustrates displaying a first state 520a of the website settings interface that corresponds to a first presentation setting (e.g., the media auto-play presentation setting) in response to detecting the request to display the website settings interface. As shown in FIG. 5B, the website settings interface includes a web browser settings region 594 within a plurality of affordances 522a, 522b, 522c, 522d, 522e, 522f, 522g, 522h, 522i, and 522j (sometimes collectively referred to as the "affordances 522") provided to modify different web browser settings in response to selection thereof. In FIG. 5B, the affordance 522h associated with the website settings is currently selected.

As shown in FIG. 5B, the website settings interface also includes a presentation settings region 590 with a plurality of user-selectable presentation setting affordances 528a, 528b, 528c, 528d, 528e, 528f, 528g, and 528h (sometimes collectively referred to as the "presentation setting affordances 528") provided to control reader-mode, content blocker, media auto-play, page zoom, camera, microphone, location, and notification presentation settings, respectively, in response to selection thereof (e.g., with a contact). In FIG. 5B, the presentation setting affordance 528c associated with the media auto-play presentation setting is currently selected.

As shown in FIG. 5B, the website settings interface further includes a controls region 592 with: a first representation of the tab 506a (e.g., associated with the URL 508a for the tab 506a) and an associated user-modifiable control 524a (e.g., a toggle or drop-down menu) provided to select a value for the media auto-play presentation setting for the URL 508a or the domain thereof; a second representation of the tab 506b (e.g., associated with the URL 508b for the tab 506b) and an associated user-modifiable control 524b (e.g., a toggle or drop-down menu) provided to select a value for the media auto-play presentation setting for the URL 508b or the domain thereof; a third representation of the tab 506c (e.g., associated with the URL 508c for the tab 506c) and an associated user-modifiable control 524c (e.g., a toggle or drop-down menu) provided to select a value for the media auto-play presentation setting for the URL 508c or the domain thereof; and a fourth representation of previously configured URL 508e and an associated user-modifiable control 526a (e.g., a toggle or drop-down menu) provided to select a value for the media auto-play presentation setting for the URL 508e or the domain thereof.

As such, in FIG. 5B, the first state 520a of the website settings interface includes a representation for each of the open tabs 506a, 506b, and 506c and a representation for a previously configured website (e.g., the URL 508e). As shown in FIG. 5B, the website settings interface further includes: a remove affordance 530 provided to remove a representation for a previously configured website; and a default user-modifiable control 532 (e.g., a toggle or drop-down menu) provided to select a predetermined value for the media auto-play presentation setting. As shown in FIG. 5B, the value of the user-modifiable controls 524a, 524b, and 524c are set to the "Deny" state, the value of user-modifiable control 526a is set to the "Allow" state, and the predetermined value of the default user-modifiable control 532 is set to the "Deny" state. According to some embodiments, the current values for the user-modifiable controls 524a, 524b, and 524c are set based on aggregate preferences (e.g., crowd-sourced data) for the associated web pages or domains thereof. According to some embodiments, the current values for the user-modifiable controls 524a, 524b, and 524c are set based on the predetermined value associated with the default user-modifiable control 532 (e.g., the "Deny" state).

Figure 5C:
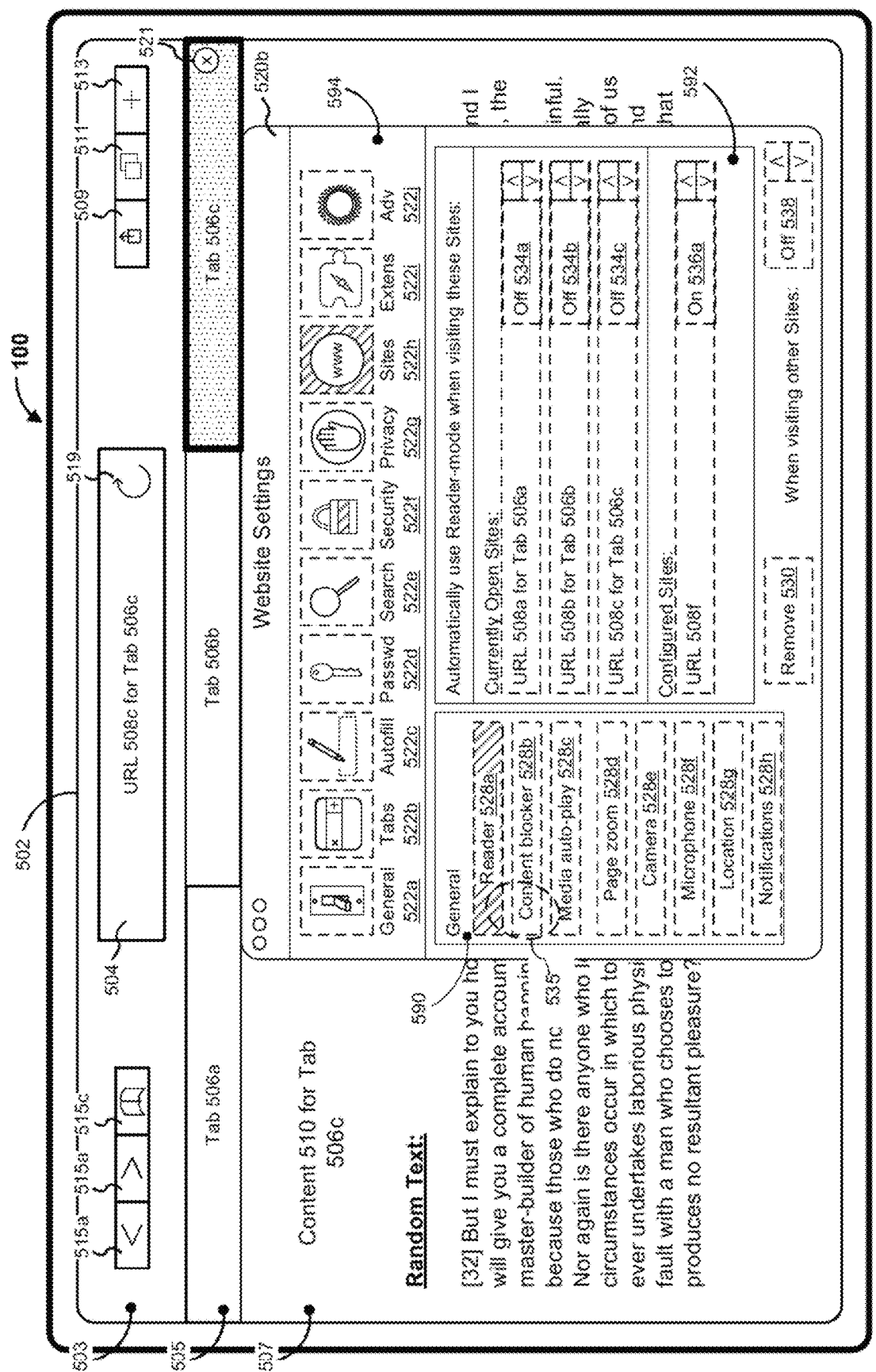
Figure 5D:
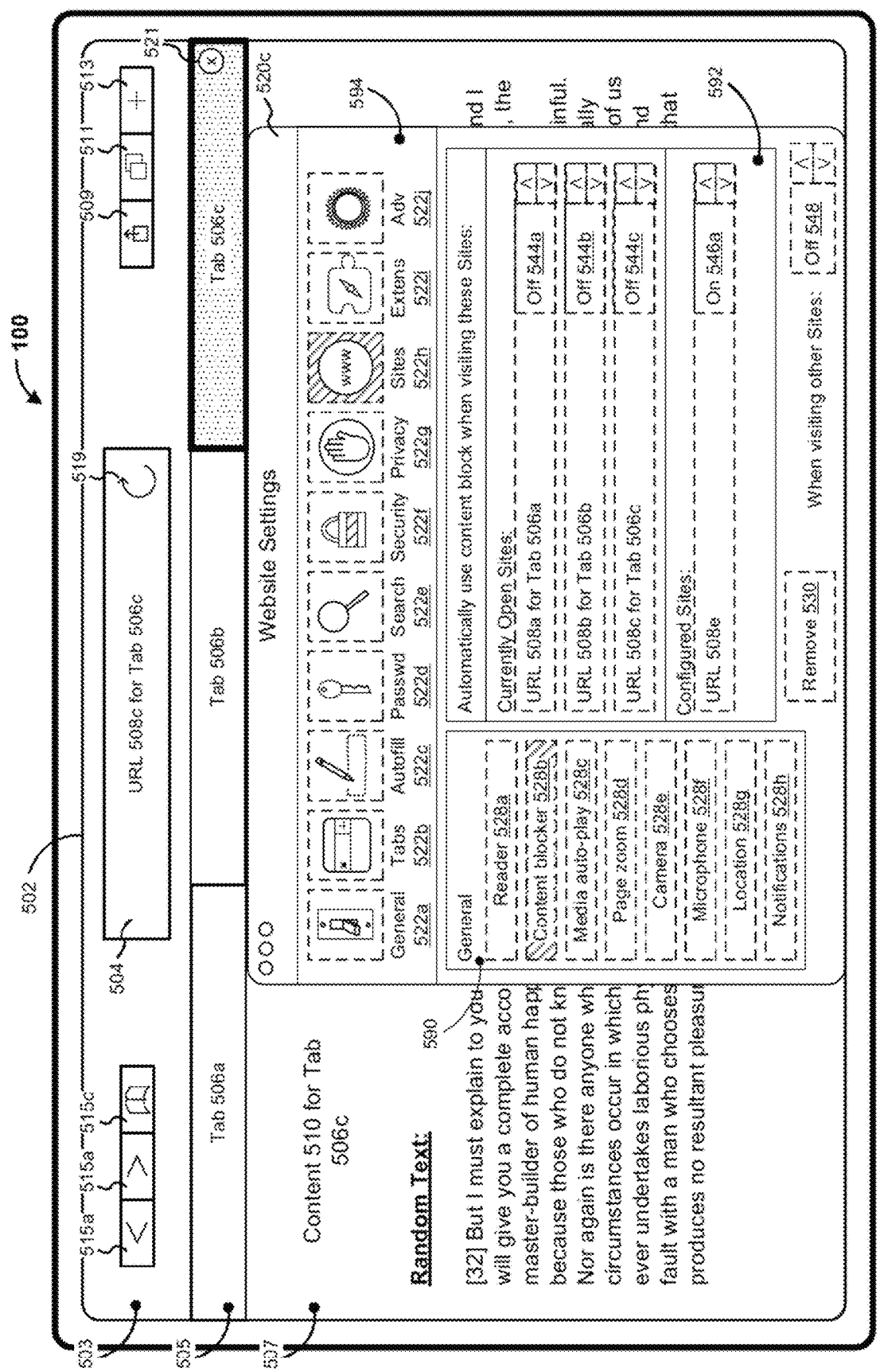

FIGS. 5B-5D show a sequence in which user-modifiable controls for different presentation settings are displayed within the website settings interface. FIG. 5B also illustrates detecting a contact 525 at a location that corresponds to the presentation setting affordance 528a associated with the read-mode presentation setting. FIG. 5C illustrates displaying a second state 520b of the website settings interface that corresponds to a second presentation setting (e.g., the reader-mode presentation setting) in response to detecting the selection of the presentation setting affordance 528a in FIG. 5B.

As shown in FIG. 5C, the controls region 592 includes: a first representation of the tab 506a (e.g., associated with the URL 508a for the tab 506a) and an associated user-modifiable control 534a (e.g., a toggle or drop-down menu) provided to select a value for the reader-mode presentation setting for the URL 508a or the domain thereof; a second representation of the tab 506b (e.g., associated with the URL 508b for the tab 506b) and an associated user-modifiable control 534b (e.g., a toggle or drop-down menu) provided to select a value for the reader-mode presentation setting for the URL 508b or the domain thereof; a third representation of the tab 506c (e.g., associated with the URL 508c for the tab 506c) and an associated user-modifiable control 534c (e.g., a toggle or drop-down menu) provided to select a value for the reader-mode presentation setting for the URL 508c or the domain thereof; and a fourth representation of previously configured URL 508f and an associated user-modifiable control 536a (e.g., a toggle or drop-down menu) provided to select a value for the reader-mode presentation setting for the URL 508f or the domain thereof.

As such, in FIG. 5C, the second state 520b of the website settings interface includes a representation for each of the open tabs 506a, 506b, and 506c and a representation for a previously configured website (e.g., the URL 508f). As shown in FIG. 5C, the website settings interface includes a default user-modifiable control 538 (e.g., a toggle or drop-down menu) provided to select a predetermined value for the reader-mode presentation setting. As shown in FIG. 5C, the value of the user-modifiable controls 534a, 534b, and 534c are set to the "Off" state, the value of user-modifiable control 536a is set to the "On" state, and the predetermined value of the default user-modifiable control 538 is set to the "Off" state.

FIG. 5C also illustrates detecting a contact 535 at a location that corresponds to the presentation setting affordance 528b associated with the content blocker presentation setting. FIG. 5D illustrates displaying a third state 520c of the website settings interface that corresponds to a third presentation setting (e.g., the content blocker presentation setting) in response to detecting the selection of the presentation setting affordance 528b in FIG. 5C.

As shown in FIG. 5D, the controls region 592 includes: a first representation of the tab 506a (e.g., associated with the URL 508a for the tab 506a) and an associated user-modifiable control 544a (e.g., a toggle or drop-down menu) provided to select a value for the content blocker presentation setting for the URL 508a or the domain thereof a second representation of the tab 506b (e.g., associated with the URL 508b for the tab 506b) and an associated user-modifiable control 544b (e.g., a toggle or drop-down menu) provided to select a value for the content blocker presentation setting for the URL 508b or the domain thereof a third representation of the tab 506c (e.g., associated with the URL 508c for the tab 506c) and an associated user-modifiable control 544c (e.g., a toggle or drop-down menu) provided to select a value for the content blocker presentation setting for the URL 508c or the domain thereof; and a fourth representation of previously configured URL 508e and an associated user-modifiable control 546a (e.g., a toggle or drop-down menu) provided to select a value for the content blocker presentation setting for the URL 508e or the domain thereof.

As such, in FIG. 5D, the third state 520c of the website settings interface includes a representation for each of the open tabs 506a, 506b, and 506c and a representation for a previously configured website (e.g., the URL 508e). As shown in FIG. 5D, the website settings interface includes a default user-modifiable control 548 (e.g., a toggle or drop-down menu) provided to select a predetermined value for the content blocker presentation setting. As shown in FIG. 5D, the value of the user-modifiable controls 544a, 544b, and 544c are set to the "Off" state, the value of user-modifiable control 546a is set to the "On" state, and the predetermined value of the default user-modifiable control 548 is set to the "Off" state.

Figure 5E:
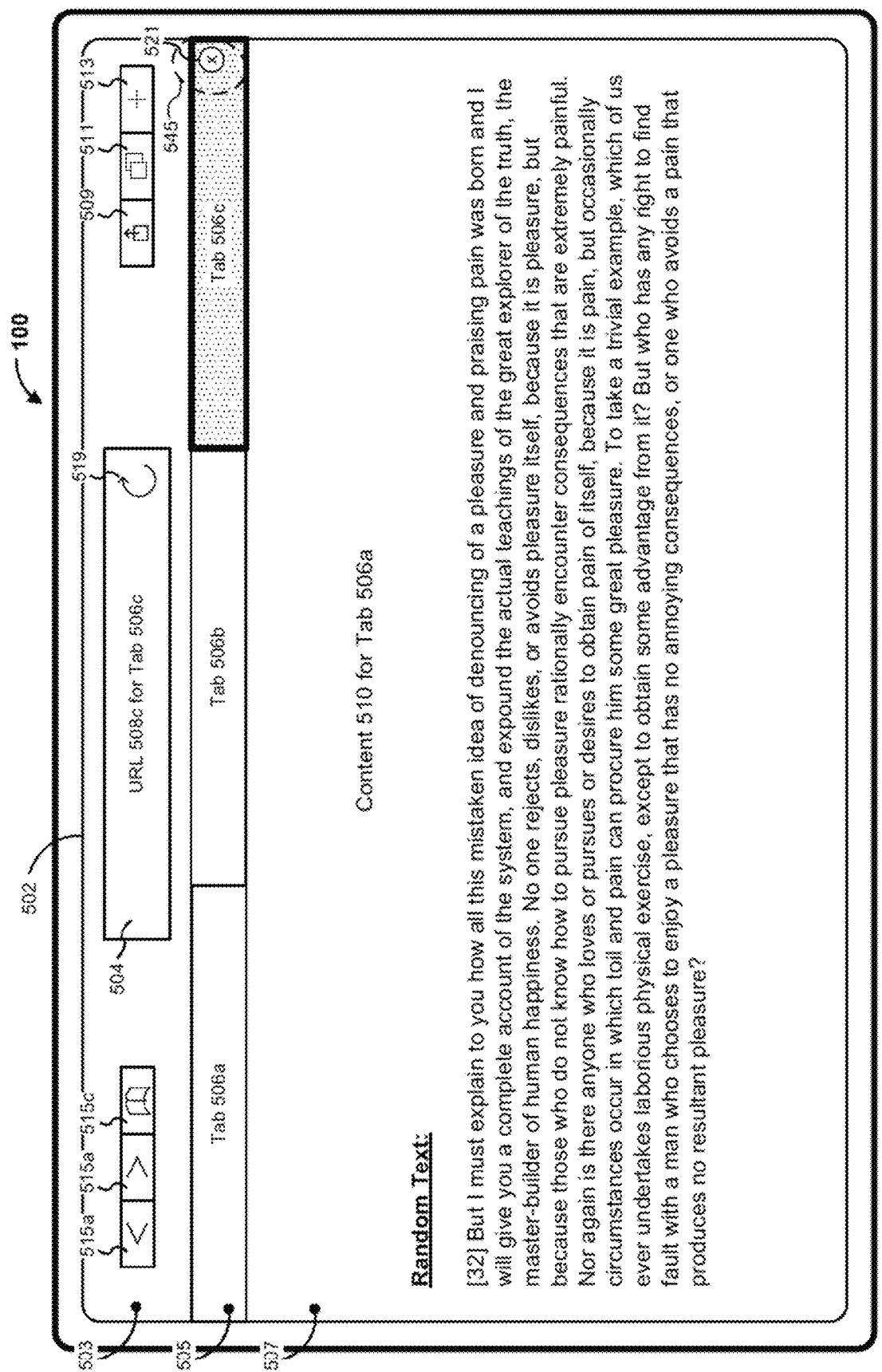
Figure 5F:
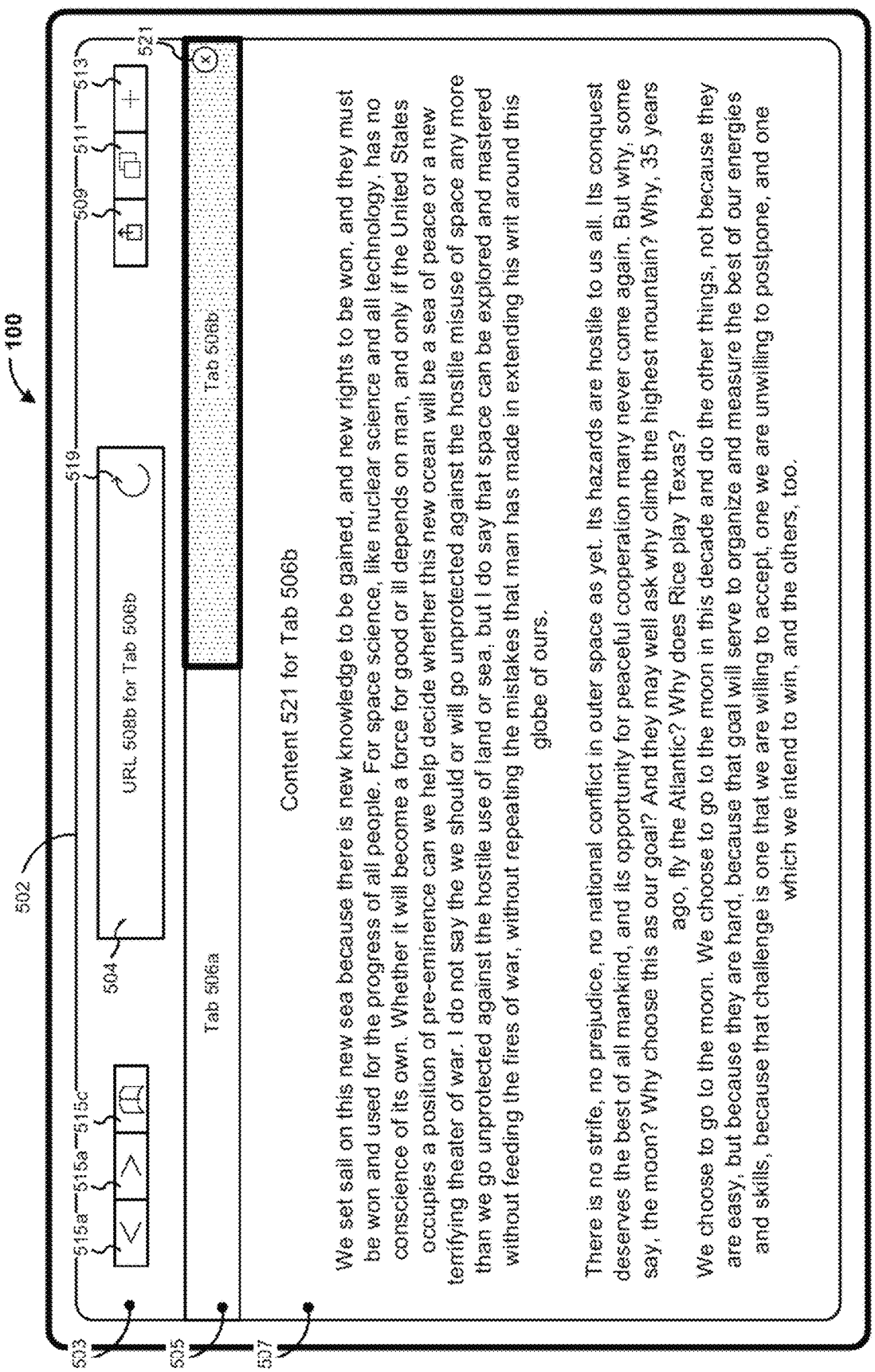
Figure 5G:
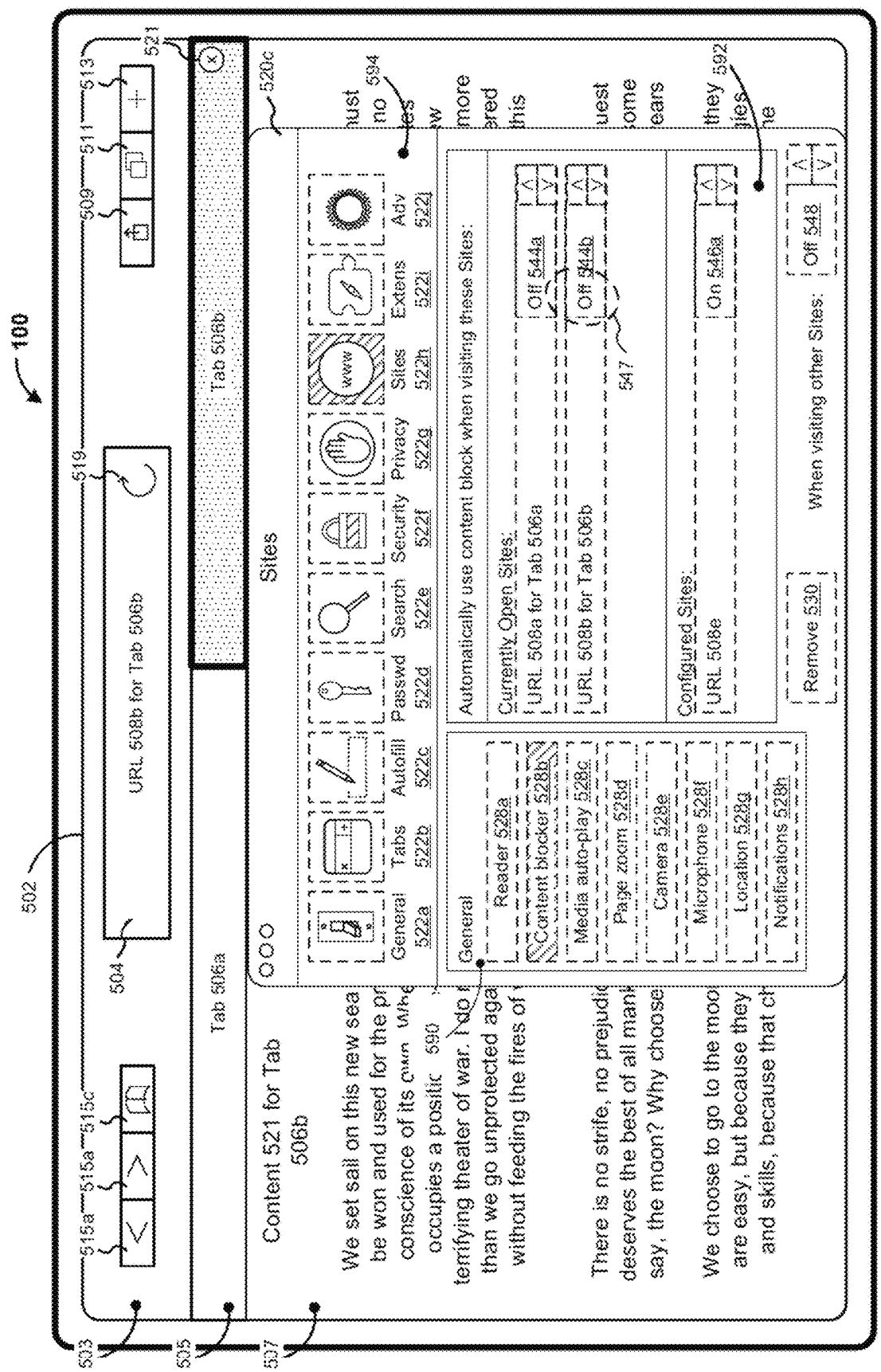

FIGS. 5E-5G show a sequence in which a tab is closed and the website settings interface is redisplayed. For example, the device 100 ceases to display the website settings interface in response to detecting a closure input (e.g., selection of a close affordance or detection of a predefined voice command, key combination, etc.). FIG. 5E illustrates ceasing to display the website settings interface overlaid on the web browser interface 502 in response to detecting a closure input. The web browser interface 502 in FIG. 5E is similar to and adapted from the web browser interface 502 in FIG. 5A. As such, FIG. 5A and FIG. 5E include similar user interfaces and elements labeled with the same reference number in both figures have the same function, with only the differences described herein for the sake of brevity.

FIG. 5E also illustrates detecting a contact 545 at a location that corresponds to the affordance 521 (e.g., the close affordance) associated with the tab 506c. FIG. 5F illustrates ceasing to display the tab 506c within the tab bar region 505 in response to selection of the affordance 521 in FIG. 5E. As shown in FIG. 5F, the tab 506b is currently selected, and the content region 507 includes content 521 for the tab 506b. In FIG. 5F, the device 100 displays the affordance 521 (e.g., the close affordance) proximate to the tab 506b, which, when activated (e.g., selected with a contact), cause the web browser application to close the tabs 506b.

For example, the device 100 detects a request (e.g., one of the user inputs described above) to display the website settings interface. FIG. 5G illustrates displaying the third state 520c of the website settings interface that corresponds to the third presentation setting (e.g., the content blocker presentation setting) in response to detecting the request to display the website settings interface. The website settings interface in FIG. 5G is similar to and adapted from the website settings interface in FIG. 5D. As such, FIG. 5D and FIG. 5G include similar user interfaces and elements labeled with the same reference number in both figures have the same function, with only the differences described herein for the sake of brevity. As shown in FIG. 5G, the controls region 592 no longer includes the third representation of the tab 506c as the tab 506c was closed in FIGS. 5E-5F. As such, in FIG. 5G, the website settings interface includes a representation for each of the open tabs 506a and 506b and a representation for the previously configured website (e.g., the URL 508e).

Figure 5H:
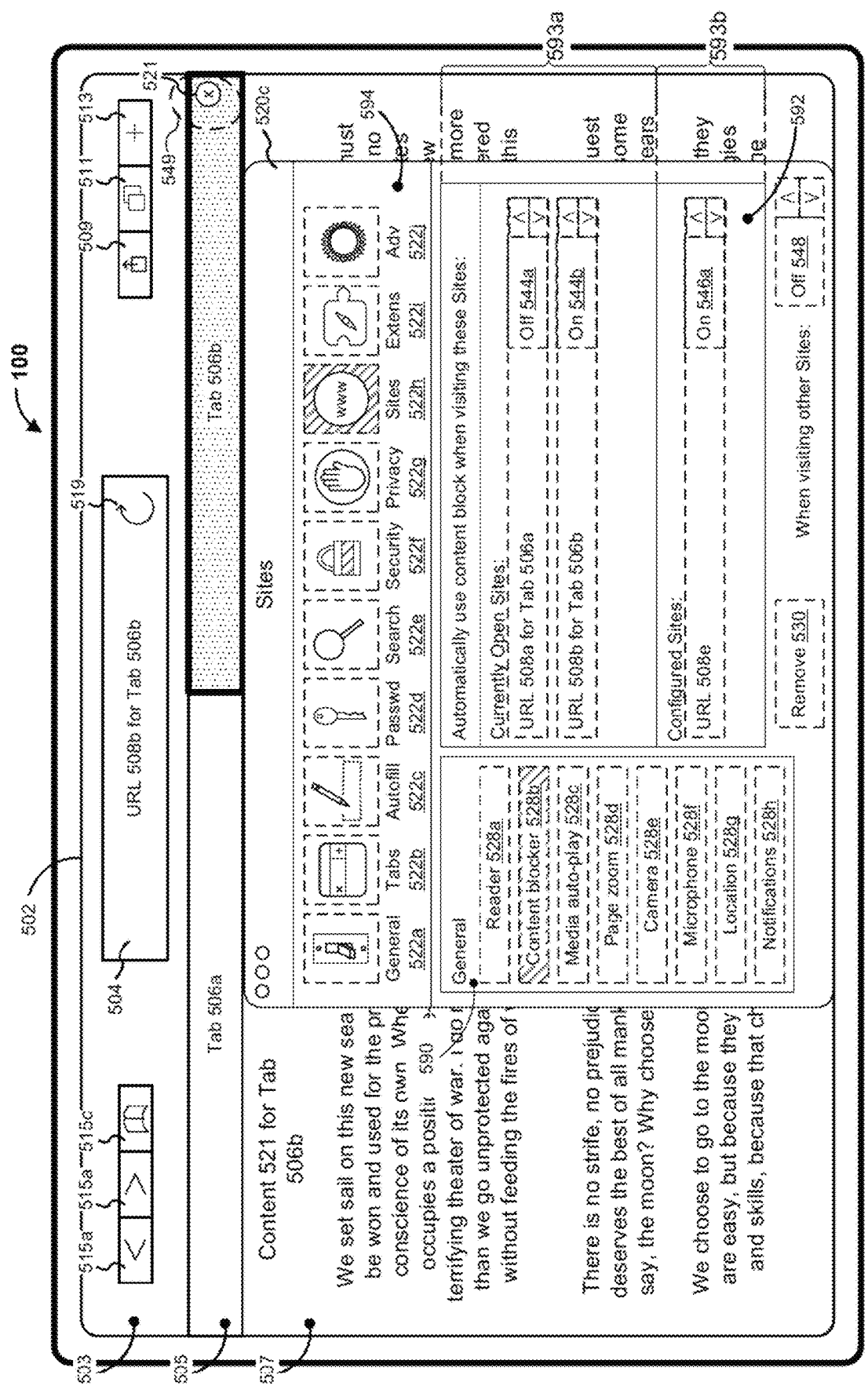

FIGS. 5G-5H show a sequence in which a value of one of the user-modifiable controls is changed. FIG. 5G also illustrates detecting a contact 547 (e.g., a tap/selection gesture) at a location that corresponds to the user-modifiable control 544b associated with the tab 506b. FIG. 5H illustrates toggling the value of the user-modifiable control 544b from the "Off" state to the "On" state in response to the selection of the user-modifiable control 544b in FIG. 5G.

Figure 5I:
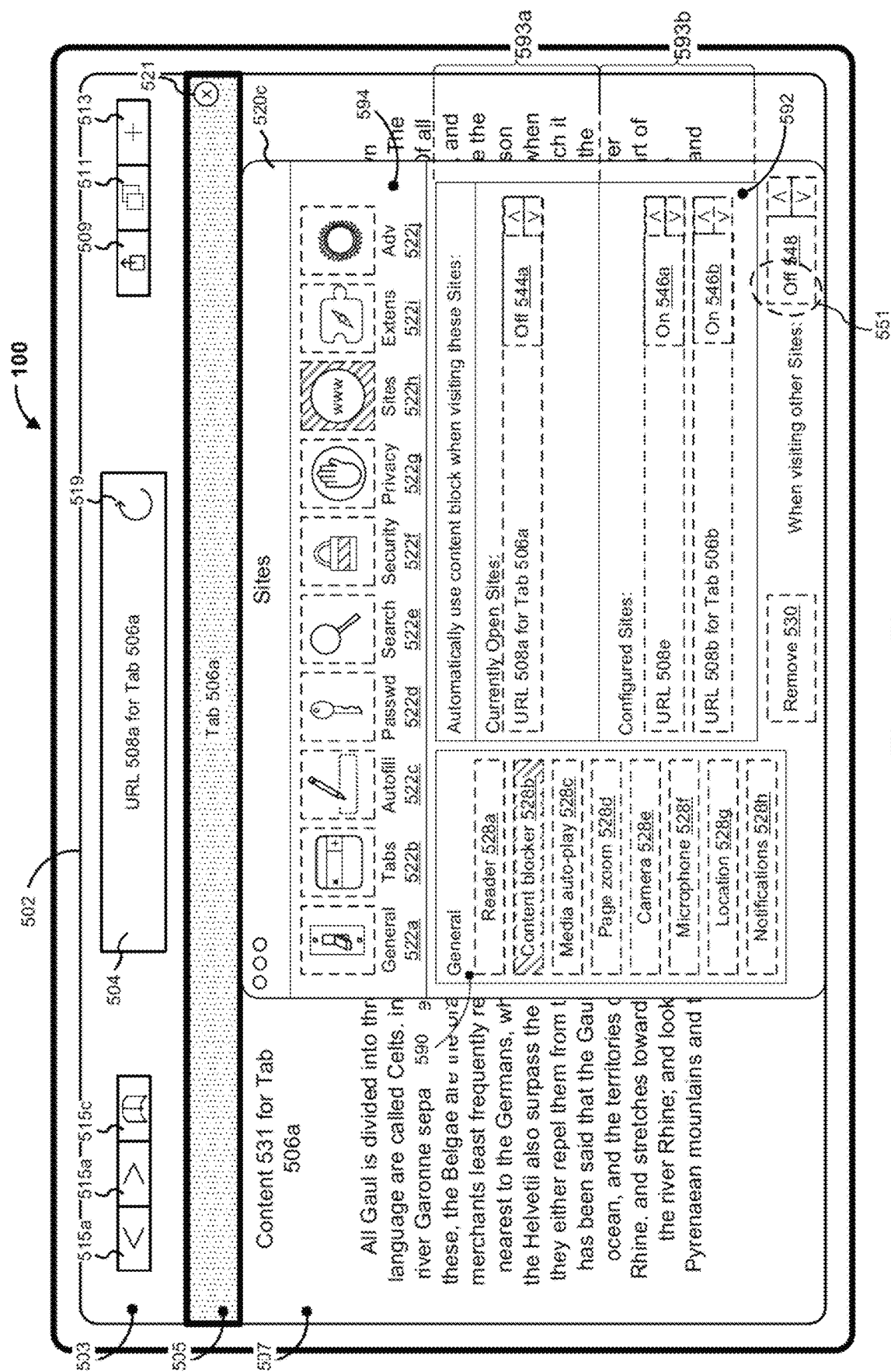

FIGS. 5H-5I show a sequence in which a tab is closed while the website settings interface is displayed. FIG. 5H also illustrates detecting a contact 549 at a location that corresponds to the affordance 521 (e.g., the close affordance) associated with the tab 506b. FIG. 5I illustrates ceasing to display the tab 506b within the tab bar region 505 in response to the selection of the affordance 521 in FIG. 5H. As shown in FIG. 5I, the tab 506a is currently selected, and the content region 507 includes content 531 for the tab 506a. In FIG. 5I, the device 100 displays the affordance 521 (e.g., the close affordance) proximate to the tab 506a, which, when activated (e.g., selected with a contact), cause the web browser application to close the tabs 506a.

As shown in FIG. 5I, the controls region 592 no longer includes the second representation of the tab 506b in the currently open websites portion 593a of the control region 592 as it was closed in response to the selection of the affordance 521 in FIG. 5H. As shown in FIG. 5I, the configured websites portion 593b of the control region 592 includes a fifth representation of the previously configured URL 508b (e.g., configured in FIGS. 5G-5H) and an associated user-modifiable control 546b (e.g., a toggle or drop-down menu) provided to select a value for the content blocker presentation setting for the URL 508b or the domain thereof. As such, in FIG. 5I, the website settings interface includes a representation for the open tab 506a and representations for the previously configured websites (e.g., the URLs 508e and 508b).

Figure 5J:
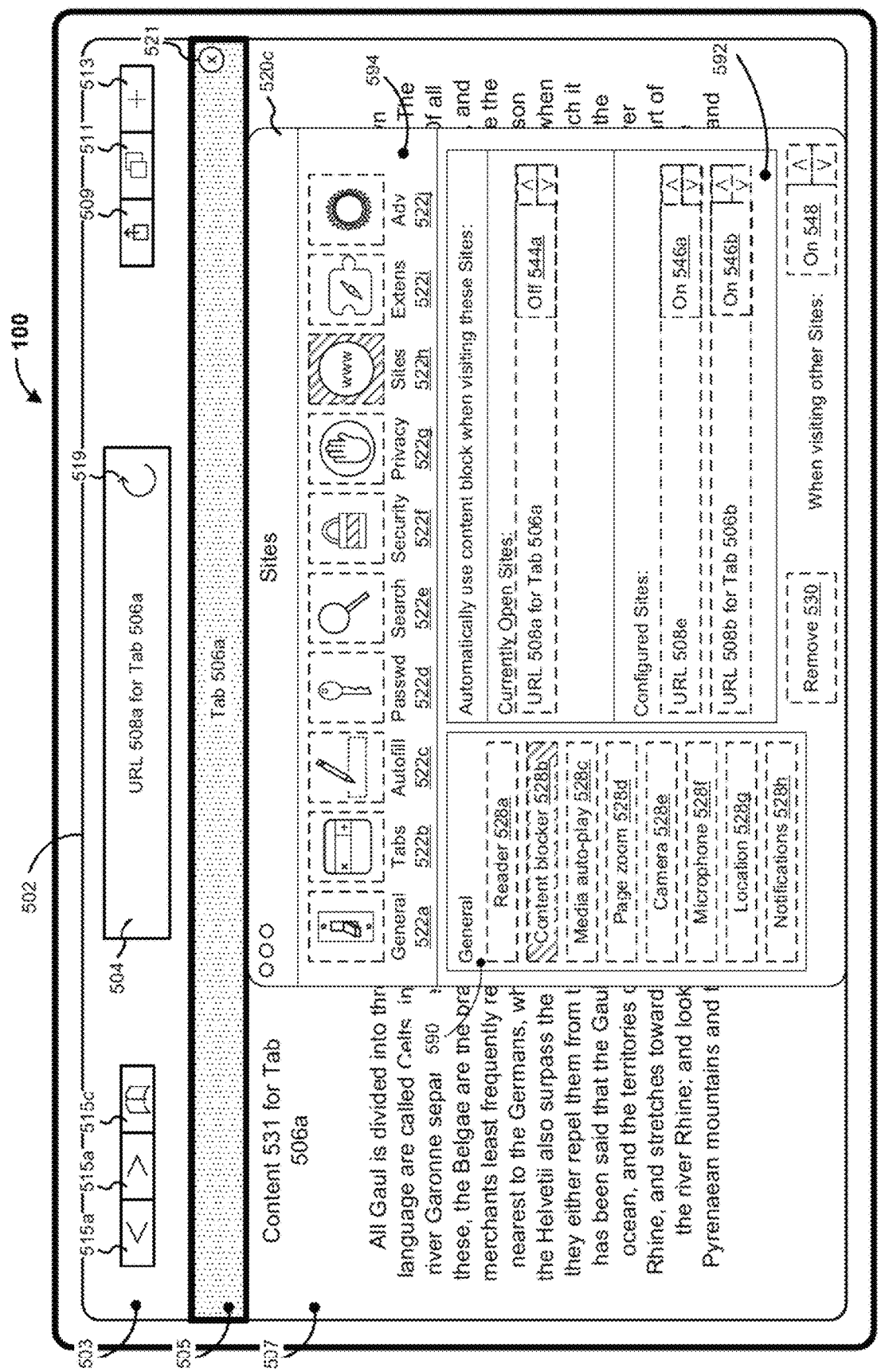
Figure 5K:
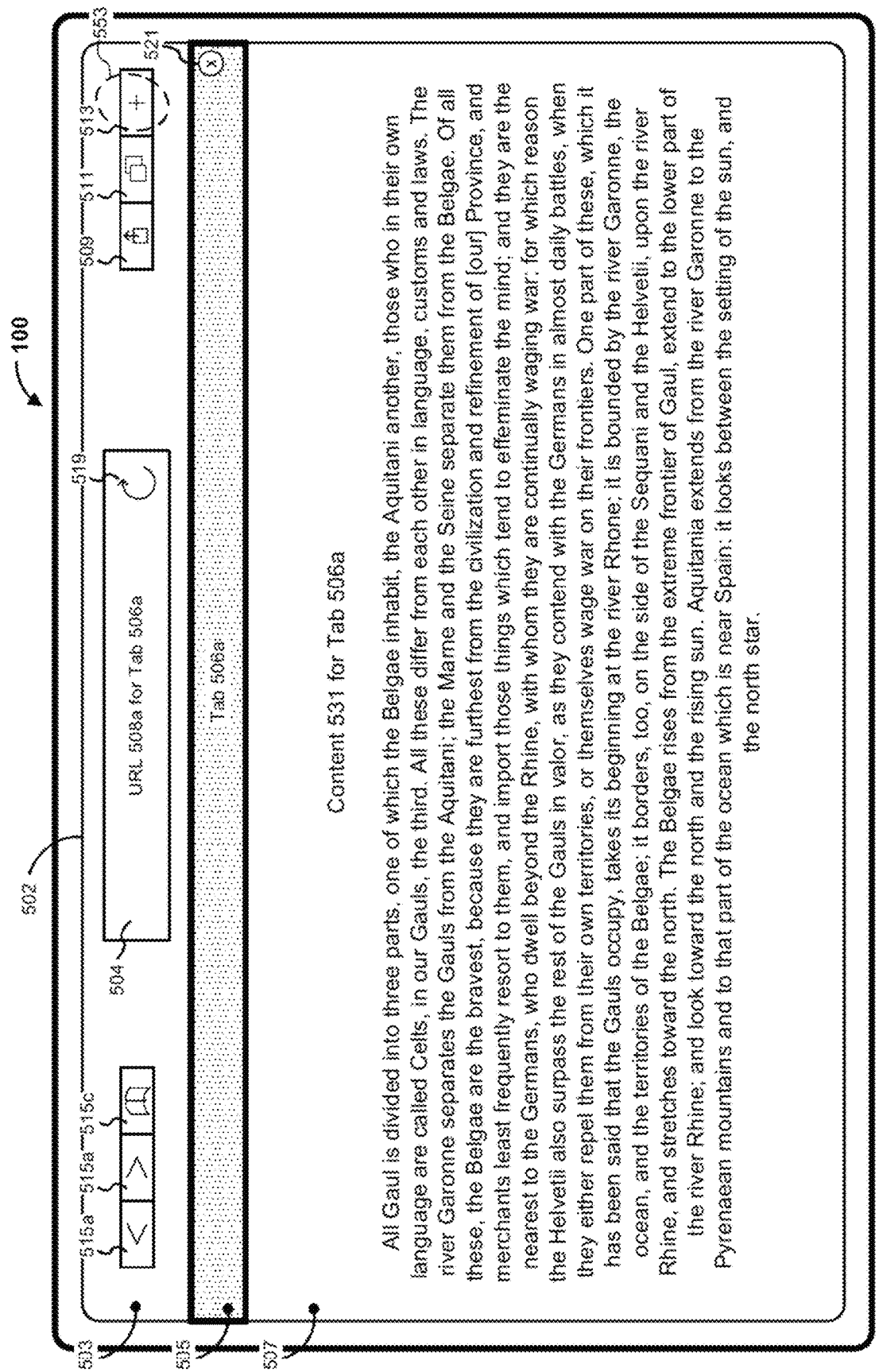
Figure 5L:
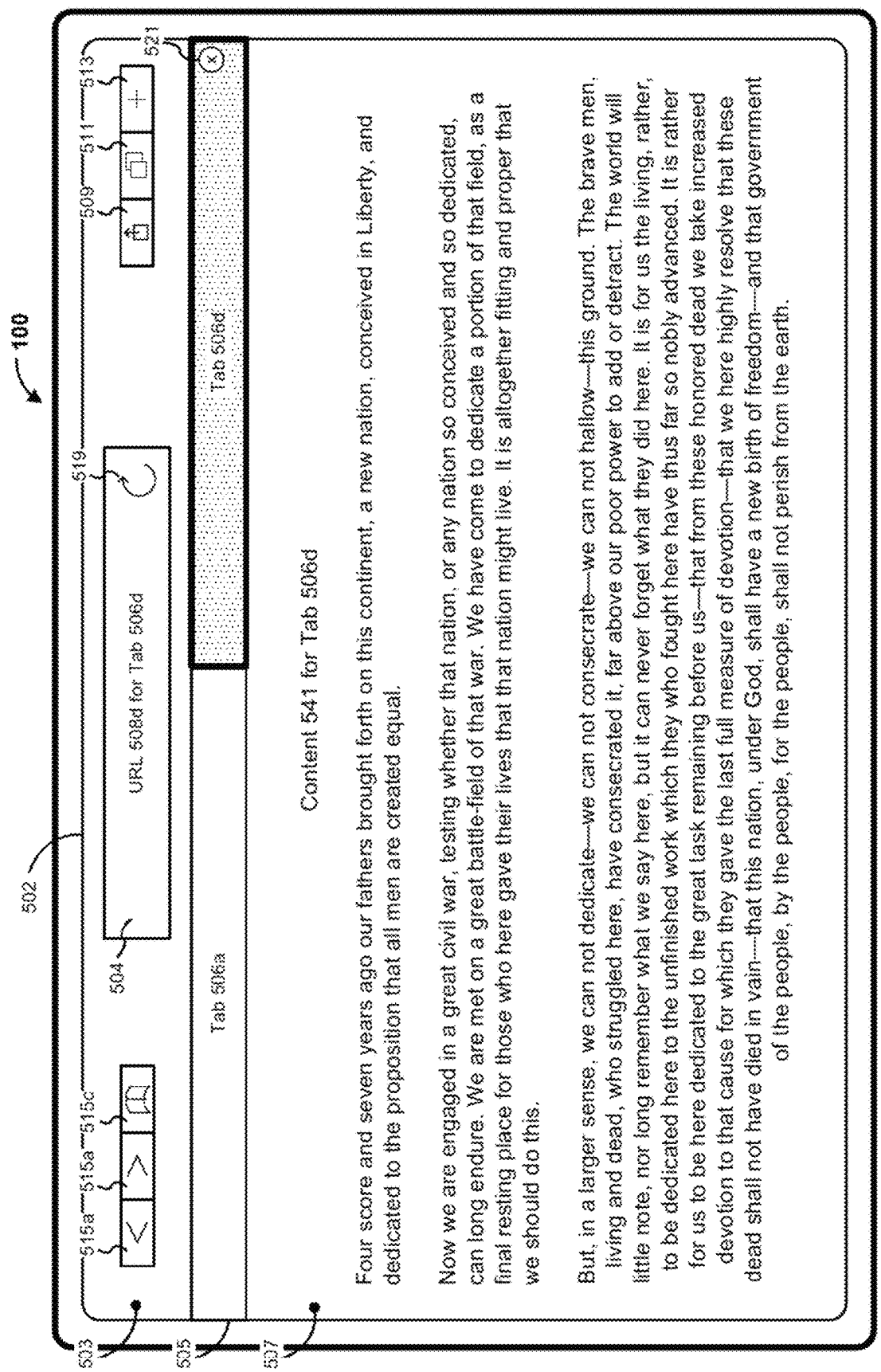

FIGS. 5I-5J show a sequence in which the predetermined value for the default user-modifiable control is changed. FIG. 5I also illustrates detecting a contact 551 (e.g., a tap/selection gesture) at a location that corresponds to the default user-modifiable control 548 associated with the content blocker presentation setting. FIG. 5J illustrates toggling the value of the default user-modifiable control 548 from the "Off" state to the "On" state in response to the selection of the default user-modifiable control 548 in FIG. 5I.

Figure 5M:
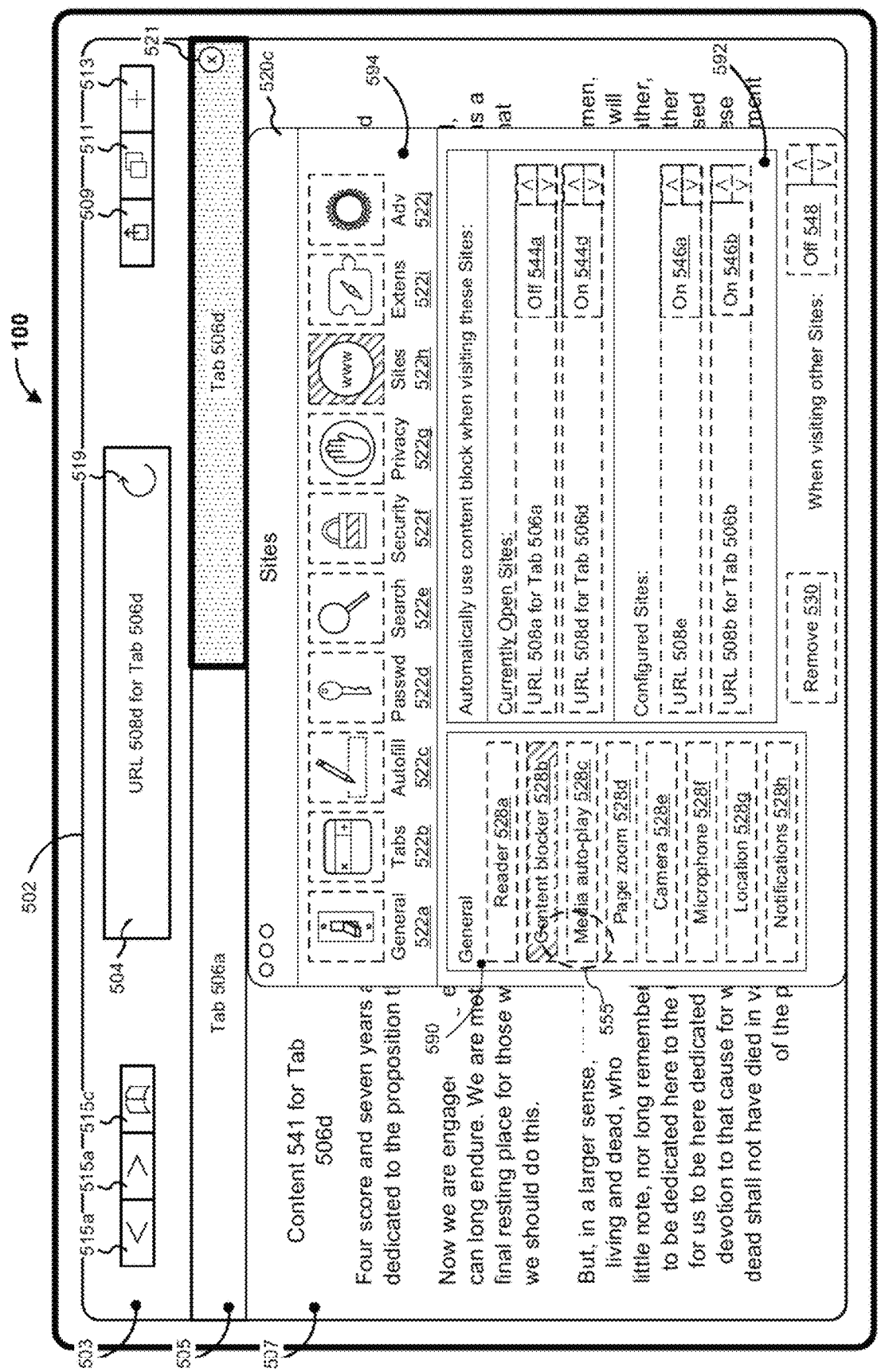

FIGS. 5K-5M show a sequence in which a new tab is opened and the website settings interface is redisplayed. For example, the device 100 ceases to display the website settings interface in response to detecting a closure input (e.g., selection of a close affordance or detection of a predefined voice command, key combination, etc.). FIG. 5K illustrates ceasing to display the website settings interface overlaid on the web browser interface 502 in response to detecting a closure input. The web browser interface 502 in FIG. 5K is similar to and adapted from the web browser interface 502 in FIG. 5F. As such, FIG. 5K and FIG. 5F include similar user interfaces and elements labeled with the same reference number in both figures have the same function, with only the differences described herein for the sake of brevity.

FIG. 5K also illustrates detecting a contact 553 at a location that corresponds to the add tab affordance 513. FIG. 5L illustrates displaying a new tab 506d within the tab bar region 505 in response to selection of the add tab affordance 513 in FIG. 5K. As shown in FIG. 5L, the tab 506d is currently selected, and the content region 507 includes content 541 for the tab 506d. In FIG. 5L, the device 100 displays the affordance 521 (e.g., the close affordance) proximate to the tab 506d, which, when activated (e.g., selected with a contact), cause the web browser application to close the tabs 506d.

For example, the device 100 detects a request (e.g., one of the user inputs described above) to display the website settings interface. FIG. 5M illustrates displaying the third state 520c of the website settings interface that corresponds to the third presentation setting (e.g., the content blocker presentation setting) in response to detecting the request to display the website settings interface. The website settings interface in FIG. 5M is similar to and adapted from the website settings interface in FIG. 5J. As such, FIG. 5J and FIG. 5M include similar user interfaces and elements labeled with the same reference number in both figures have the same function, with only the differences described herein for the sake of brevity.

As shown in FIG. 5M, the controls region 592 includes a sixth representation of the tab 506d (e.g., associated with the URL 508d for the tab 506d) and an associated user-modifiable control 544d (e.g., a toggle or drop-down menu) provided to select a value for the content blocker presentation setting for the URL 508d or the domain thereof. As such, in FIG. 5M, the website settings interface includes a representation for each of the open tabs 506a and 506d and representations for the previously configured websites (e.g., the URLs 508e and 508b). As shown in FIG. 5M, the value of the user-modifiable control 544a is set to the "Off" state, the value of the user-modifiable control 544d is set to the "On" state (e.g., based on the value of the default user-modifiable control 548 when the tab 506d was opened), and the values of user-modifiable controls 546a and 546b are set to the "On" state.

Figure 5N:
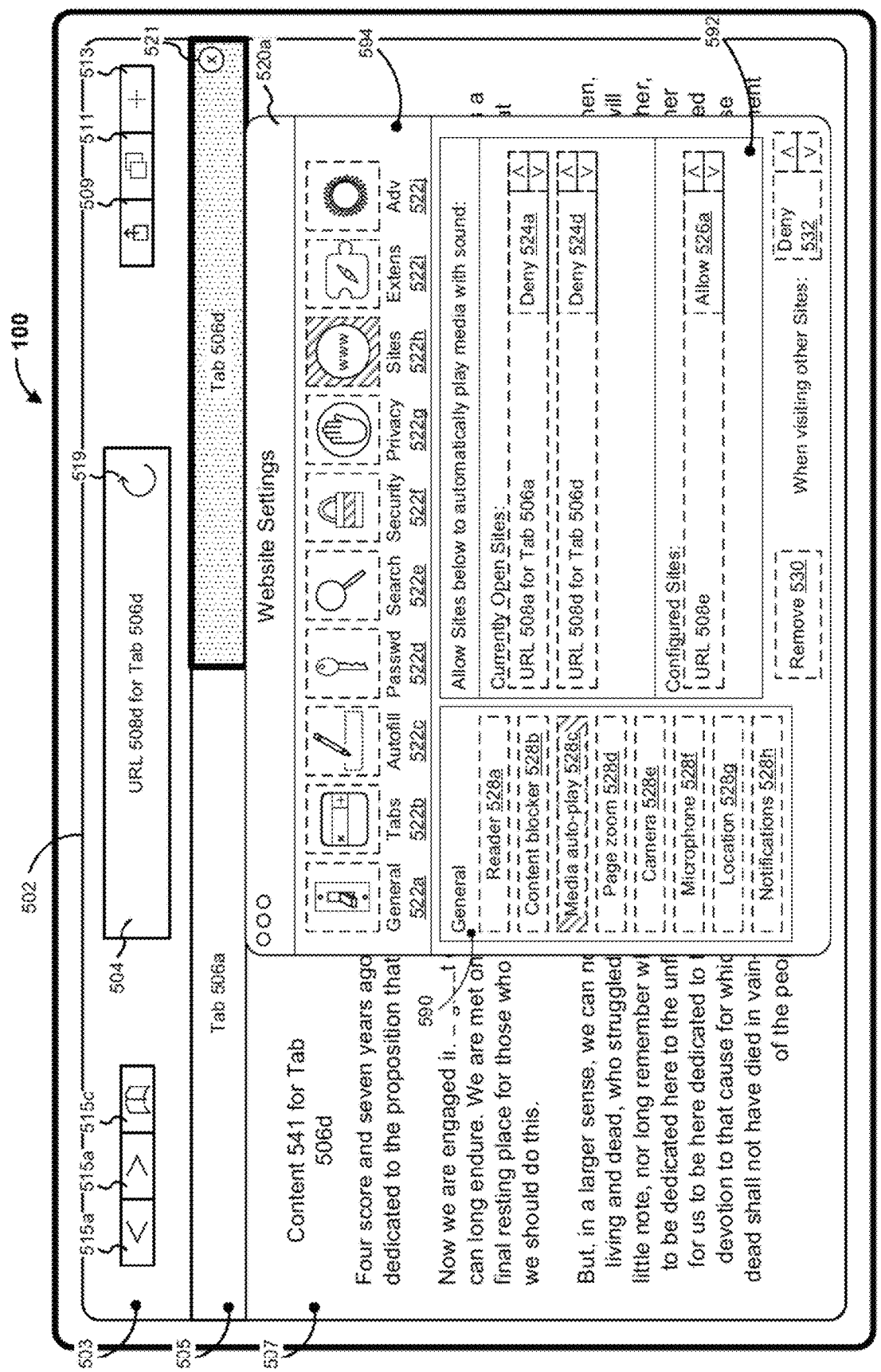

FIGS. 5M-5N show a sequence in which user-modifiable controls for a different presentation setting is displayed within the website settings interface. FIG. 5M also illustrates detecting a contact 555 at a location that corresponds to the presentation setting affordance 528c associated with the media auto-play presentation setting. FIG. 5N illustrates displaying the first state 520a of the website settings interface that corresponds to the first presentation setting (e.g., the media auto-play presentation setting) in response to detecting the selection of the presentation setting affordance 528c in FIG. 5M.

As shown in FIG. 5N, the controls region 592 includes: a first representation of the tab 506a (e.g., associated with the URL 508a for the tab 506a) and an associated user-modifiable control 524a (e.g., a toggle or drop-down menu) provided to select a value for the media auto-play presentation setting for the URL 508a or the domain thereof; a sixth representation of the tab 506d (e.g., associated with the URL 508b for the tab 506b) and an associated user-modifiable control 524d (e.g., a toggle or drop-down menu) provided to select a value for the media auto-play presentation setting for the URL 508d or the domain thereof; and a fourth representation of previously configured URL 508e and an associated user-modifiable control 526a (e.g., a toggle or drop-down menu) provided to select a value for the reader-mode presentation setting for the URL 508e or the domain thereof.

As such, in FIG. 5N, the first state 520a of the website settings interface includes a representation for each of the open tabs 506a and 506d and a representation for a previously configured website (e.g., the URL 508e). As shown in FIG. 5N, the value of the user-modifiable controls 524a and 524d are set to the "Deny" state and the value of the user-modifiable control 526a is set to the "Allow" state.

Figure 5O:
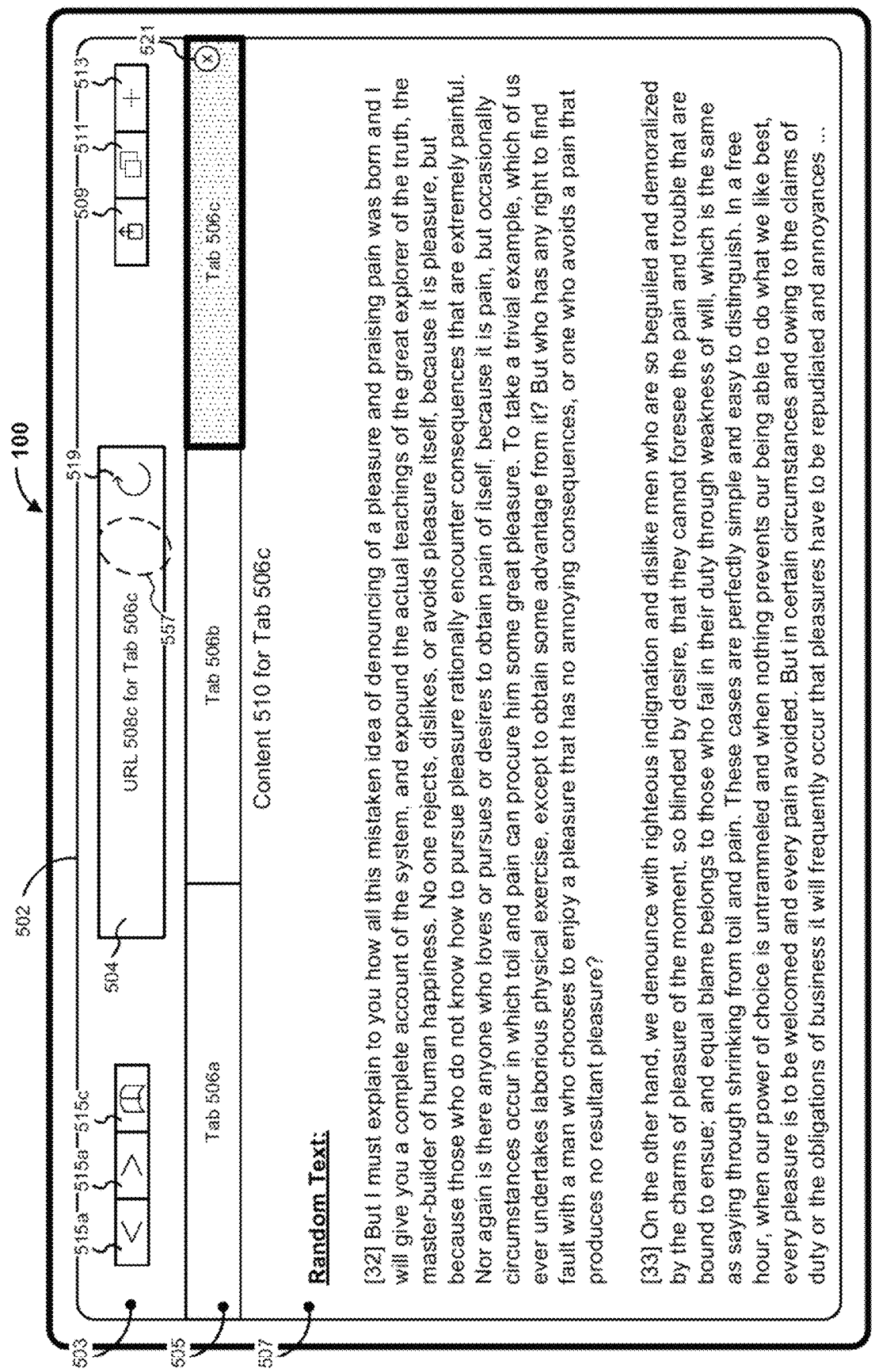
Figure 5P:
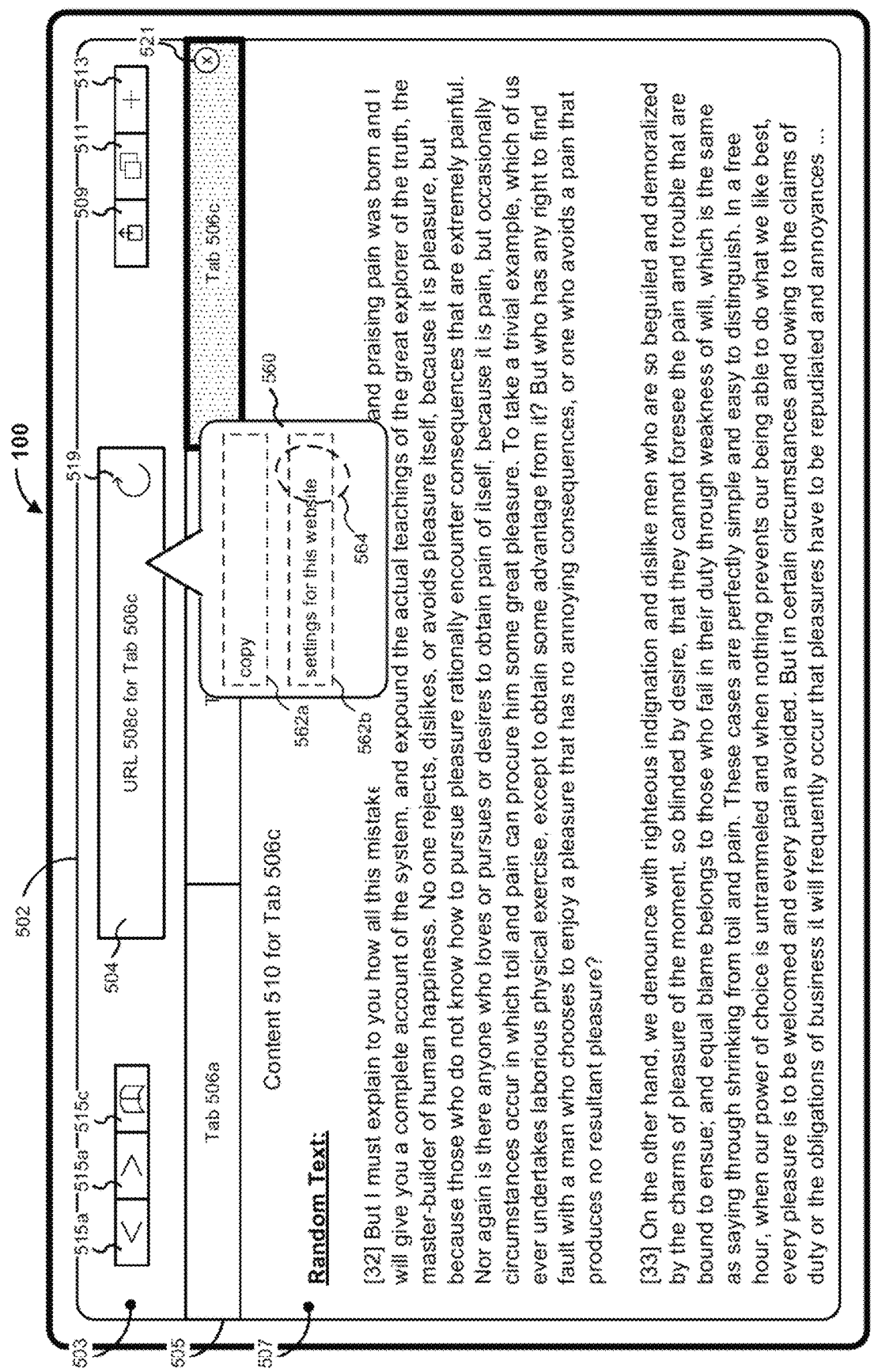
Figure 5Q:
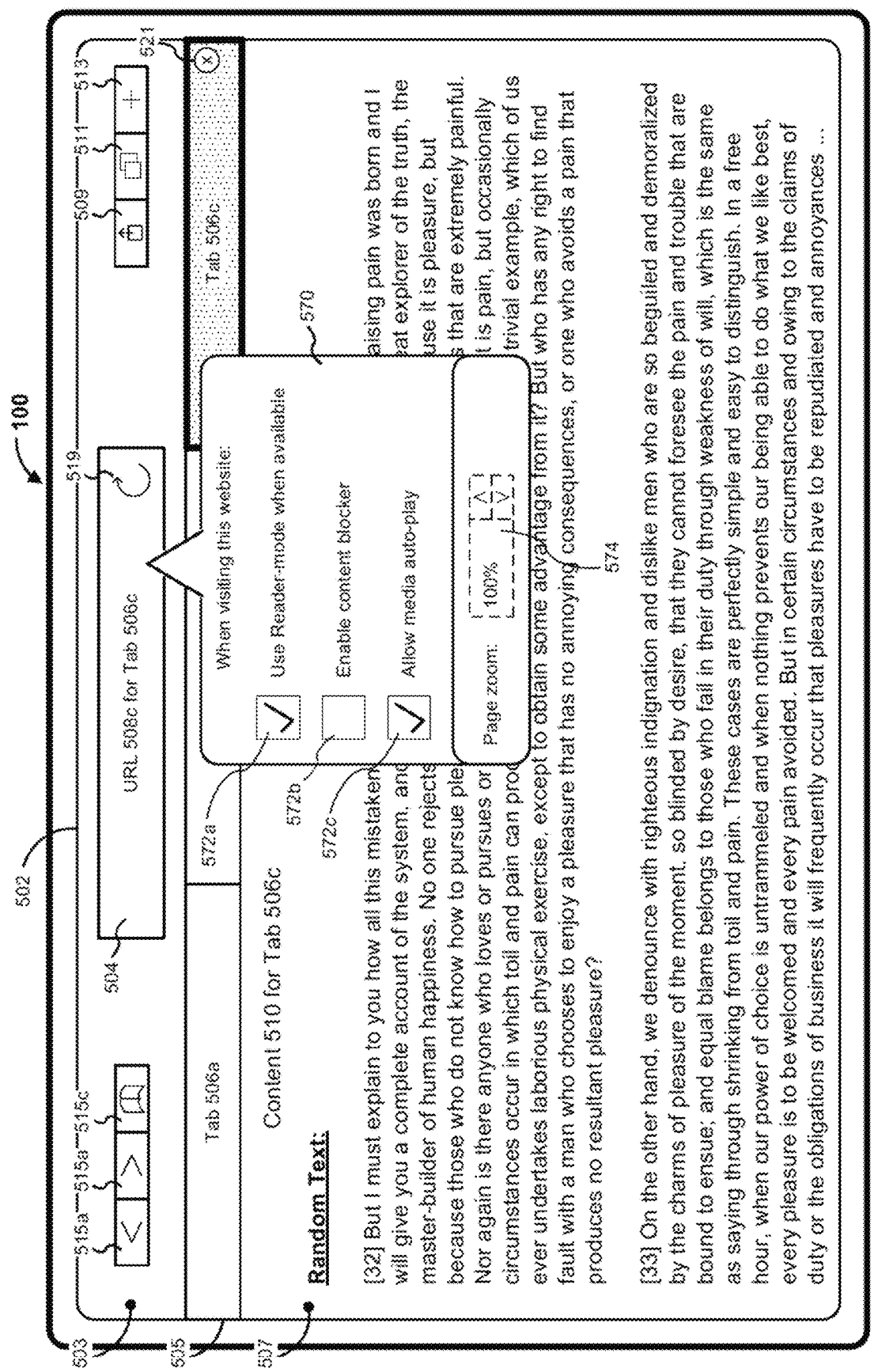

FIGS. 5O-5Q show a sequence in which a presentation settings preview interface is displayed over the web browser interface 502. The web browser interface 502 in FIG. 5O is similar to and adapted from the web browser interface 502 in FIG. 5A. As such, FIG. 5A and FIG. 5O include similar user interfaces and elements labeled with the same reference number in both figures have the same function, with only the differences described herein for the sake of brevity.

FIG. 5O illustrates detecting a contact 557 (e.g., long press or deep press gesture) at a location that corresponds to the address bar 504. FIG. 5P illustrates displaying an intermediate options interface 560 overlaid on the web browser interface 502 in response to detecting the contact 557 over the address bar 504 in FIG. 5O. As shown in FIG. 5P, the intermediate options interface 560 includes: a quick operation affordance 562a provided to perform an operation on the currently displayed web page (e.g., a copy operation or another frequently/recently used operation on the URL 508c) in response to selection thereof (e.g., with a contact); and a presentation settings preview affordance 562b provided to display a presentation settings interface 570 in response to selection thereof (e.g., as shown in FIGS. 5P-5Q).

FIG. 5P also illustrates detecting a contact 564 (e.g., a tap/selection gesture) at a location that corresponds to the presentation settings preview affordance 562b. FIG. 5Q illustrates displaying a presentation settings preview interface 570 overlaid on the web browser interface 502 in response to the selection of the presentation settings preview affordance 562b in FIG. 5P. As shown in FIG. 5Q, the presentation settings preview interface 570 includes: a first toggle affordance 572a provided to view the current value of the reader-mode presentation setting for the currently displayed web page (e.g., the URL 508c) and to toggle said current value in response to selection thereof (e.g., with a contact); a second toggle affordance 572b provided to view the current value of the content blocker presentation setting for the currently displayed web page (e.g., the URL 508c) and to toggle said current value in response to selection thereof; and a third toggle affordance 572*c* provided to view the current value of the media auto-play presentation setting for the currently displayed web page (e.g., the URL 508*c*) and to toggle said current value in response to selection thereof. As shown in FIG. 5Q, the presentation settings preview interface 570 also includes a user-modifiable control 574 (e.g., a drop-down menu) provided to adjust the page zoom for the currently displayed web page (e.g., the URL 508*c*).

FIGS. 6A-6C illustrate example user interfaces for presenting a website and associated media content according to determined presentation settings in accordance with some embodiments. The user interfaces in these figures are used to illustrate the processes described below, including the processes in FIGS. 8A-8D and FIG. 9. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 6A illustrates displaying a web browser interface 602 associated with a web browser application executed by the device 100. As shown in FIG. 6A, the web browser interface 602 includes: a toolbar region with an address bar that displays the URL 608 for tab 606; a tab bar region with the tab 606; and a content region with content 610 and media content 612 for tab 606.

In some embodiments, when loading the URL 608 in response to a request to visit the URL 608, the device 100 determines whether to allow the media content 612 to auto-play or to prevent the media content 612 from auto-playing based on the preferences in the media auto-play presentation setting hierarchy 620.

According to some embodiments, the value of the user preference 622*a* (e.g., a value previously configured/selected by a user of the device 100 for the URL 608) overrides the value of the aggregate preference 622*b* (e.g., a crowd-sourced value based on aggregate user expectations for the URL 608). According to some embodiments, the value of the aggregate preference 622*b* overrides the value of the default preference 622*c* (e.g., a predetermined backup value that has the option to be configured/selected by a user of the device 100 for the media auto-play presentation setting).

As such, if a value for the user preference 622*a* has been previously set, the device 100 determines whether to allow the media content 612 to auto-play or to prevent the media content 612 from auto-playing based on the value of the user preference 622*a* for the media auto-play presentation setting for the URL 608. If a value for the user preference 622*a* has not been set and a value for the aggregate preference 622*b* has been set, the device 100 determines whether to allow the media content 612 to auto-play or to prevent the media content 612 from auto-playing based on the value of the aggregate preference 622*b* for the media auto-play presentation setting for the URL 608. If a value for the user preference 622*a* has not been set and a value for the aggregate preference 622*b* has not been set, the device 100 determines whether to allow the media content 612 to auto-play or to prevent the media content 612 from auto-playing based on the value of the default preference 622*c* for the media auto-play presentation setting.

FIG. 6A also illustrates preventing the media content 612 from being auto-played (e.g., presented) within the web browser interface 602 due to the "deny" value for the user preference 622*a* for the media auto-play presentation setting for the URL 608 in the media auto-play presentation setting hierarchy 620. As shown in FIG. 6A, the indicator 614 indicates that the media content 612 has been prevented from being auto-played. In some embodiments, in response to a request to override the media auto-play prevention (e.g., a user input detected over the media content 612), the device 100 overrides the media auto-play prevention and presents the media content 612 within the web browser interface 602.

The web browser interface 602 in FIG. 6B is similar to and adapted from the web browser interface 602 in FIG. 6A. As such, FIG. 6A and FIG. 6B include similar user interfaces and elements labeled with the same reference number in both figures have the same function, with only the differences described herein for the sake of brevity. FIG. 6B illustrates allowing the media content 612 to be auto-played (e.g., presented) within the web browser interface 602 due to the user preference 622*a* not being set in the media auto-play presentation setting hierarchy 620 and due to the "allow" value for the aggregate preference 622*b* for the media auto-play presentation setting for the URL 608 in the media auto-play presentation setting hierarchy 620. As shown in FIG. 6B, the play back bar 616*a* and the volume bar 616*b* indicate that the media content 612 is being presented and was allowed to be auto-played.

The web browser interface 602 in FIG. 6C is similar to and adapted from the web browser interface 602 in FIG. 6A. As such, FIG. 6A and FIG. 6C include similar user interfaces and elements labeled with the same reference number in both figures have the same function, with only the differences described herein for the sake of brevity. FIG. 6C illustrates preventing the media content 612 from being auto-played (e.g., presented) within the web browser interface 602 due to the user preference 622*a* not being set in the media auto-play presentation setting hierarchy 620, due to the aggregate preference 622*b* not being set in the media auto-play presentation setting hierarchy 620, and due to the "deny" value for the default preference 622*c* for the media auto-play presentation setting in the media auto-play presentation setting hierarchy 620. As shown in FIG. 6C, the indicator 614 indicates that the media content 612 has been prevented from being auto-played.

FIGS. 7A-7C illustrate a flow diagram of a method 700 of modifying presentation settings within a website settings interface in accordance with some embodiments. The method 700 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the one or more input devices are on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 700 are, optionally, combined and/or the order of some operations is, optionally, changed.

As described below, the method 700 provides an intuitive way to modify presentation settings within a website settings interface. The method reduces the cognitive burden on a user when modifying presentation settings within a website settings interface, thereby creating a more efficient human-machine interface. For battery-operated electronic devices, enabling a user to modify presentation settings within a website settings interface faster and more efficiently conserves power and increases the time between battery charges.

While displaying a plurality of websites within a web browsing application (e.g., open tabs), the device displays (702), on the display, a website settings interface provided to edit a plurality of a presentation settings for at least one website of the plurality of websites, including concurrently displaying: a first representation of a first website of the plurality of websites and a first user-modifiable control for selecting a first value for a first presentation setting for the first website; and a second representation of a second website of the plurality of websites and a second user-modifiable control for selecting a second value for the first presentation setting for the second website, where the second value for the first presentation setting for the second website is not associated with a previously received user preference (e.g., an input by the user of the device) and the second value for the first presentation setting for the second web site is set according to a predetermined value for the first presentation setting. For example, the at least one website includes the plurality of open websites and (optionally) one or more previously configured websites. In some embodiments, the website settings interface includes a representation for all open websites and an associated a user-modifiable control provided to select a value for a respective presentation setting (e.g., media auto-play, content block, or reader-mode). In some embodiments, the website settings interface includes a representation for all websites with a previously configured value for a respective presentation setting (e.g., media auto-play, content block, or reader-mode) and an associated a user-modifiable control provided to modify the value for the respective presentation setting. According to some embodiments, the website settings interface provides a seamless user experience that requires less time and user inputs when modifying presentation settings for open and/or previously configured websites, which, additionally, reduces power usage and improves battery life of the device by enabling the user to use the device more quickly and efficiently.

In some embodiments, the first presentation setting corresponds to reader-mode setting, a content blocker setting, a media auto-play setting, a page zoom setting, a camera setting, a microphone setting, a location setting, a notifications setting, or the like. In some embodiments, the first website corresponds to one of the open tabs/websites. In some embodiments, the first website corresponds to a previously configured website. For example, the first representation for the first website includes a name of the domain or web page for the first website and (optionally) an associated icon. According to some embodiments, the first user-modifiable control corresponds to a binary toggle, scroll through list, drop-down menu, or the like. In some embodiments, the state (e.g., the value) of the first user-modifiable control corresponds to previously configured user preference for the first presentation setting for the first website. In some embodiments, the state of the first user-modifiable control corresponds to an aggregate (e.g., crowd-sourced) preference for the first presentation setting for the first website. In some embodiments, the state of the first user-modifiable control corresponds to a default preference for the first presentation setting.

In some embodiments, the predetermined value for the first presentation setting corresponds to an aggregate (e.g., crowd-sourced) preference for the first presentation setting for the second website. In some embodiments, the predetermined value for the first presentation setting for the second website corresponds to a default preference for the first presentation setting. In some embodiments, the predetermined value is determined at a domain level. In some embodiments, the predetermined value is determined at a web page level.

As one example, with reference to FIG. 5A-5B, the device 100 displays first state 520a of the website settings interface overlaid on the web browser interface 502 in response to detecting a user input selecting a first affordance within a toolbar of the web browsing application (e.g., a file affordance in the toolbar or title bar, a preferences affordance, etc.), which displays a drop-down menu, followed by a detecting a subsequent user input selecting a settings affordance within the drop-down menu. As another example, the device 100 displays first state 520a of the website settings interface overlaid on the web browser interface 502 in response to detecting a user input selecting a website options affordance within a control panel or OS settings panel. As yet another example, the device 100 displays first state 520a of the website settings interface overlaid on the web browser interface 502 in response to detecting a predefined key combination, voice command, gesture, and/or the like.

For example, in FIG. 5B, the device displays the first state 520a of the website settings interface that corresponds to a first presentation setting (e.g., the media auto-play presentation setting). As shown in FIG. 5B, the first state 520a of the website settings interface includes: a first representation of the tab 506a (e.g., associated with the URL 508a for the tab 506a) and an associated user-modifiable control 524a (e.g., a toggle or drop-down menu) provided to select a value for the media auto-play presentation setting for the URL 508a or the domain thereof; a second representation of the tab 506b (e.g., associated with the URL 508b for the tab 506b) and an associated user-modifiable control 524b (e.g., a toggle or drop-down menu) provided to select a value for the media auto-play presentation setting for the URL 508b or the domain thereof; a third representation of the tab 506c (e.g., associated with the URL 508c for the tab 506c) and an associated user-modifiable control 524c (e.g., a toggle or drop-down menu) provided to select a value for the media auto-play presentation setting for the URL 508c or the domain thereof; and a fourth representation of previously configured URL 508e and an associated user-modifiable control 526a (e.g., a toggle or drop-down menu) provided to select a value for the media auto-play presentation setting for the URL 508e or the domain thereof.

As such, in FIG. 5B, the first state 520a of the website settings interface includes a representation for each of the open websites/tabs 506a, 506b, and 506c and a representation for a previously configured website (e.g., the URL 508e). As shown in FIG. 5B, the value of the user-modifiable controls 524a, 524b, and 524c are set to the "Deny" state, the value of user-modifiable control 526a is set to the "Allow" state, and the predetermined value of the default user-modifiable control 532 is set to the "Deny" state. According to some embodiments, the current values for the user-modifiable controls 524a, 524b, and 524c are set based on the predetermined value associated with the default user-modifiable control 532 (e.g., the "Deny" state).

In some embodiments, the first value for the first presentation setting for the first website is set (704) according to a value configured by a user of the device (e.g., a previously received user preference), and the first web site does not correspond to one of the plurality of open websites. In some embodiments, the value for the first presentation setting for the first website was previously configured by the user. As one example, in FIG. 5B, the first state 520a of the website settings interface includes a fourth representation of previously configured URL 508e and an associated user-modifiable control 526a (e.g., a toggle or drop-down menu) provided to select a value for the media auto-play presentation setting for the URL 508e or the domain thereof. In this example, the user of the device 100 previously configured the media-auto play presentation setting to the "Allow" state for the URL 508e.

In some embodiments, the first value for the first presentation setting for the first website is (706) different from the predetermined value for the first presentation setting for the second website. In some embodiments, the predetermined value for the first presentation setting for the second web site corresponds to a default preference, and the value for the first presentation setting for the first website is a custom user value due to the user interacting with the first user-modifiable control.

In some embodiments, the website settings interface further includes (708) an additional user-modifiable control for selecting the predetermined value for the first presentation setting. In some embodiments, the predetermined value for the first presentation setting governs the initial state of the user-modifiable controls for non-configured websites. According to some embodiments, the additional user-modifiable control (e.g., the default user-modifiable control) within the website settings interface provides a seamless user experience that requires less time and user inputs when selecting the predetermined value (e.g., default preference) for a presentation setting, which, additionally, reduces power usage and improves battery life of the device by enabling the user to use the device more quickly and efficiently.

In some embodiments, the predetermined value corresponds to the aggregate (e.g., crowd sourced) preference for the first presentation setting if available. In some embodiments, the predetermined value corresponds to the value of the additional user-modifiable control (e.g., the default user-modifiable control 532 in FIG. 5B) if an aggregate preference for the first presentation setting is unavailable. In some embodiments, the predetermined value corresponds to the value of the default preference (e.g., the value of the additional user-modifiable control). For example, in FIG. 5B, the first state 520a of the website settings interface includes a default user-modifiable control 532 (e.g., a toggle or drop-down menu) provided to select a predetermined value for the media auto-play presentation setting.

In some embodiments, the website settings interface further includes (710) a removal affordance for removing a configured value for the first presentation setting for a website. In some embodiments, the removal affordance enables the user to remove previously configured websites. For example, in FIG. 5B, the first state 520a of the website settings interface includes a remove affordance 530 provided to remove a representation for a previously configured website. According to some embodiments, the removal affordance within the website settings interface provides a seamless user experience that requires less time and user inputs when removing previously configured value (e.g., user preferences) for a presentation setting, which, additionally, reduces power usage and improves battery life of the device by enabling the user to use the device more quickly and efficiently.

In response to detecting a first input that ceases display of the second website within the web browsing application (e.g., an input that corresponds to closing a tab), the device displays (712), on the display, the website settings interface, where the website settings interface includes the first representation of the first website and does not include the second representation of the second website. According to some embodiments, dynamically updating the website settings interface when websites/tabs are opened or closed provides a seamless and intuitive user experience that requires less time and user inputs when modifying presentation settings for open and/or previously configured websites, which, additionally, reduces power usage and improves battery life of the device by enabling the user to use the device more quickly and efficiently.

For example, in response to detecting the first input, the device ceases to display the website setting interface and displays the closure of a tab associated with the second website within the web browsing application. Continuing with this example, the device detects a sequence of one or more subsequent inputs that correspond to re-displaying the website setting interface where the website setting interface includes the first representation of the first website but not the second representation of the second website. As one example, the device re-displays the website setting interface in response to detecting a user input selecting a first affordance within a toolbar of the web browsing application (e.g., file, preferences, etc.) which displays a drop-down menu followed by a detecting a subsequent user input selecting a settings affordance within the drop-down menu. As another example, the device re-displays the website setting interface in response to detecting a user input selecting a website options affordance within a control panel or OS settings panel. As yet another example, the device re-displays the website setting interface in response to detecting a predefined key combination, voice command, gesture, and/or the like.

As one example, FIGS. 5D-5G show a sequence in which a third representation of the tab 506c (e.g., associated with the URL 508c) is shown within the third state 520c of the website settings interface while the tab 506c is open within the web browser application (e.g., in FIG. 5D), and, after the tab 506c is closed within the web browser application (e.g., in FIGS. 5E-5F), the third representation of the tab 506c is not shown within the third state 520c of the website settings interface (e.g., in FIG. 5G).

In another example, in response to detecting the first input, the device closes the tab associated with the second website and maintains display of the website setting interface. Continuing with this example, the device ceases to display the second representation of the second website within the website setting interface and maintains display of the first representation of the first website within the website setting interface. In some embodiments, if the second value for the first presentation setting for the second website was configured by the user, the second representation of the second website remains within the website settings interface. As one example, the second representation of the second website is moved from an open websites sub-region of the website setting interface to a configured websites sub-region of the website setting interface.

In some embodiments, in response to detecting a second input that ceases display of the second website within the web browsing application (e.g., an input that corresponds to closing a tab), the device displays (714), on the display, the website settings interface, where: in accordance with a determination that the first presentation setting for the first website has been configured by a user of the device and the first value for the first presentation setting for the first website is set according to a value configured by the user of the device (e.g., the user toggles the first user-modifiable control), displaying the website setting interface includes displaying the first representation of the first website; and, in accordance with a determination that the first presentation setting for the first website has not been configured by the user of the device and the first value for the first presentation setting for the first website is set according to the predetermined value for the first presentation setting, displaying the website setting interface does not include displaying the first representation of the first website. According to some embodiments, dynamically updating the website settings interface when websites/tabs are opened or closed provides a seamless and intuitive user experience that requires less time and user inputs when modifying presentation settings for open and/or previously configured websites, which, additionally, reduces power usage and improves battery life of the device by enabling the user to use the device more quickly and efficiently.

In some embodiments, if the first value for the first presentation setting for the first website was configured by the user, the first representation of the first website remains within the website settings interface. For example, the first representation of the first website is moved from an open websites sub-region of the website setting interface to a configured websites sub-region of the website setting interface.

In some embodiments, if the first value for the first presentation setting for the first website was not configured by the user, the first representation of the first website ceases to be displayed within the website settings interface. For example, in response to detecting the second input, the device ceases to display the website setting interface and displays the closure of a tab associated with the first website within the web browsing application. Continuing with this example, the device detects a sequence of one or more subsequent inputs that correspond to re-displaying the website setting interface where the website setting interface includes the first representation of the first website if the above condition is true. In another example, in response to detecting the second input, the device closes the tab associated with the first website and maintains display of the website setting interface. Continuing with this example, the device maintains display of the first representation of the first website within the website setting interface if the above condition is true.

As one example, FIGS. 5H-5I show a sequence in which a second representation of the tab 506*b* (e.g., associated with the URL 508*b*) is shown within the third state 520*c* of the website settings interface while the tab 506*b* is open within the web browser application (e.g., in FIG. 5H), and, after the tab 506*b* is closed within the web browser application (e.g., in FIGS. 5H-5I), the second representation of the tab 506*b* is not shown within the currently open websites portion 593*a* of the third state 520*c* of the website settings interface (e.g., in FIG. 5I) and a fifth representation of the previously configured URL 508*b* (e.g., configured in FIGS. 5G-5H) is shown within the configured websites portion 593*b* of the third state 520*c* of the website settings (e.g., in FIG. 5I).

In some embodiments, in response to detecting a third input that corresponds to displaying a new website within the web browsing application (e.g., an input that corresponds to opening a new tab), the device displays (716), on the display, the website settings interface, where the website settings interface includes: the first representation of the first website; and a third representation of the new website and a third user-modifiable control for selecting a third value for the first presentation setting for the new website. According to some embodiments, dynamically updating the website settings interface when websites/tabs are opened or closed provides a seamless and intuitive user experience that requires less time and user inputs when modifying presentation settings for open and/or previously configured websites, which, additionally, reduces power usage and improves battery life of the device by enabling the user to use the device more quickly and efficiently.

In some embodiments, when a new website is opened within the web browser (e.g., a new tab therefor), an additional representation and an associated user-modifiable control is displayed within the website setting interface. In one example, if the website has not been configured, the additional representation is displayed within the open websites sub-region of the website setting interface along with the first and second representations (e.g., the region 593*a* in FIG. 5H). In another example, if the website was previously configured, the additional representation moves from configured websites sub-region of the website setting interface to the open websites sub-region of the website setting interface along with the first and second representations.

For example, in response to detecting the third input, the device ceases to display the website setting interface and displays the opening of a tab associated with the third website within the web browsing application. Continuing with this example, the device detects a sequence of one or more subsequent inputs that correspond to re-displaying the website setting interface where the website setting interface includes the first representation of the first website and the third representation of the third website. In another example, in response to detecting the third input, the device opens the tab associated with the third website and maintains display of the website setting interface. Continuing with this example, the device maintains display of the first representation of the first website within the website setting interface and also displays the third representation of the third website within the website setting interface.

As one example, FIGS. 5K-5M show a sequence in which a new tab 506*d* (e.g., associated with the URL 508*d*) is opened within the web browser application (e.g., in FIGS. 5K-5L), and, after the third state 520*c* of the website settings interface is redisplayed, a sixth representation of the new tab 506*d* (e.g., associated with the URL 508*d*) is shown within the third state 520*c* of the website settings interface.

In some embodiments, the device (718): while displaying, on the display, content that corresponds to the first website (e.g., within the web browser application), detects, via the one or more input devices, a fourth input that corresponds to previewing the first value for the first presentation setting for the first website (e.g., long press on the address bar while the first website is displayed within the web browser); and, in response to detecting the fourth input, displays, on the display, a presentation settings preview interface (e.g., a pop-up pane/panel overlaid on the content that corresponds to the first website), where the presentation settings preview interface at least includes the first value for the first presentation setting for the first website. According to some embodiments, the presentation settings preview interface provides a seamless user experience that requires less time and user inputs when viewing and modifying presentation settings for a currently displayed website, which, additionally, reduces power usage and improves battery life of the device by enabling the user to use the device more quickly and efficiently.

In some embodiments, the presentation settings preview interface includes at least some of reader-mode setting, a content block setting, a media auto-play setting, or a page zoom setting. For example, the presentation settings preview interface includes the current state for the first presentation setting for the first website, and (optionally) the current state of one or more others presentation settings for the first website. In some embodiments, the first value for the first presentation setting for the first website is user-modifiable (e.g., the first presentation setting is associated with a radio button or toggle to change the first value for the first presentation setting).

For example, FIGS. 5O-5Q show a sequence in which a presentation settings preview interface 570 is displayed over the web browser interface 502. As shown in FIG. 5Q, the presentation settings preview interface 570 includes: a first toggle affordance 572a provided to view the current value of the reader-mode presentation setting for the currently displayed web page (e.g., the URL 508c) and to toggle said current value in response to selection thereof (e.g., with a contact); a second toggle affordance 572b provided to view the current value of the content blocker presentation setting for the currently displayed web page (e.g., the URL 508c) and to toggle said current value in response to selection thereof; and a third toggle affordance 572c provided to view the current value of the media auto-play presentation setting for the currently displayed web page (e.g., the URL 508c) and to toggle said current value in response to selection thereof.

In some embodiments, the website settings interface includes (720): a first region with a plurality of presentation setting affordances (e.g., a picker sidebar) provided to edit different presentation settings for the at least one website of the plurality of websites (e.g., reader-mode, content blocker, media auto-play, page zoom, camera, microphone, location, and/or notifications settings), where a first presentation setting affordance associated with the first presentation setting is currently selected; and a second region that includes: the first representation of the first website and the first user-modifiable control for selecting the first value for the first presentation setting for the first website; and the second representation of the second website and the second user-modifiable control for selecting the second value for the first presentation setting for the second website. For example, the second region includes a row/entry for each currently open website/tab and/or previously configured web site.

As one example, in FIG. 5B, the first state 520a of the website settings interface includes a presentation settings region 590 (e.g., the first region) with a plurality of user-selectable presentation setting affordances 528a, 528b, 528c, 528d, 528e, 528f, 528g, and 528h (sometimes collectively referred to as the "presentation setting affordances 528") provided to control reader-mode, content blocker, media auto-play, page zoom, camera, microphone, location, and notification presentation settings, respectively, in response to selection thereof (e.g., with a contact). In FIG. 5B, the presentation setting affordance 528c associated with the media auto-play presentation setting is currently selected.

Continuing with the above example, as shown in FIG. 5B, the first state 520a of the website settings interface further includes a controls region 592 (e.g., the second region) with: a first representation of the tab 506a (e.g., associated with the URL 508a for the tab 506a) and an associated user-modifiable control 524a (e.g., a toggle or drop-down menu) provided to select a value for the media auto-play presentation setting for the URL 508a or the domain thereof; a second representation of the tab 506b (e.g., associated with the URL 508b for the tab 506b) and an associated user-modifiable control 524b (e.g., a toggle or drop-down menu) provided to select a value for the media auto-play presentation setting for the URL 508b or the domain thereof; a third representation of the tab 506c (e.g., associated with the URL 508c for the tab 506c) and an associated user-modifiable control 524c (e.g., a toggle or drop-down menu) provided to select a value for the media auto-play presentation setting for the URL 508c or the domain thereof; and a fourth representation of previously configured URL 508e and an associated user-modifiable control 526a (e.g., a toggle or drop-down menu) provided to select a value for the media auto-play presentation setting for the URL 508e or the domain thereof. As such, in FIG. 5B, the first state 520a of the website settings interface includes a representation for each of the open websites/tabs 506a, 506b, and 506c and a representation for a previously configured website (e.g., the URL 508e)

In some embodiments, the device (722): detects, via the one or more input devices, a selection input that corresponds to selection of a second presentation setting affordance associated with a second presentation setting within the first region; and, in response to detecting the selection input, updating the second region to concurrently display: the first representation of the first website and a third user-modifiable control for selecting a first value for the second presentation setting for the first website; and the second representation of the second website and a fourth user-modifiable control for selecting a second value for the second presentation setting for the second website. According to some embodiments, the website settings interface provides a seamless user experience that requires less time and user inputs when modifying presentation settings for open and/or previously configured websites, which, additionally, reduces power usage and improves battery life of the device by enabling the user to use the device more quickly and efficiently.

In some embodiments, the third and fourth user-modifiable controls associated with the second presentation setting are different from the first and second user-modifiable controls associated with the first presentation setting. As one example, the first and second user-modifiable controls correspond to binary toggles for the first presentation setting, and the third and fourth user-modifiable controls correspond to drop-down menus including three or more values for the second presentation setting. In some embodiments, when the actionable presentation setting is changed from the first presentation setting to the second presentation setting, representations for the open websites are maintained but representations for previously configured websites change.

As one example, FIGS. 5B-5C show a sequence in which the website setting interface transitions from the first state 520a that corresponds to a first presentation setting (e.g., the media auto-play presentation setting) to the second state 520b that corresponds to the second presentation setting (e.g., the reader-mode presentation setting) in response to the selection of the presentation setting affordance 528a associated with the read-mode presentation setting in FIG. 5B. As another example, FIGS. 5C-5D show a sequence in which the website setting interface transitions from the second state 520b that corresponds to the second presentation setting (e.g., the reader-mode presentation setting) to the third state 520c that corresponds to a third presentation setting (e.g., the content blocker presentation setting) in response to the selection of the presentation setting affordance 528b associated with the content blocker presentation setting in FIG. 5C.

In some embodiments, prior to detecting the selection input, the website setting interface includes (724) a third representation of a third website and a fifth user-modifiable control for changing a third value for the first presentation setting for the third website, the third value is set according to a value configured by a user of the device, and, after detecting the selection input, the website setting interface does not include a third representation of the third website. According to some embodiments, dynamically updating the website settings interface to show user-modifiable controls for open and/or previously configured websites when transitioning between different presentation settings provides a seamless and intuitive user experience that requires less time and user inputs, which, additionally, reduces power usage and improves battery life of the device by enabling the user to use the device more quickly and efficiently.

For example, the second presentation setting for the third website was not previously set by the user of the device. As such, in this example, the device does not display the third representation of the third website when the website settings interface is updated to show values for the second presentation setting. Conversely, in another example, the device does not display a fourth representation for a fourth website within the website setting interface prior to detecting the selection input because the first presentation setting was not previously set by the user of the device for the fourth website. However, continuing with this example, when the website settings interface is updated to show values for the second presentation setting, the device displays the fourth representation for the fourth website because the second presentation setting for the fourth website was previously set by the user of the device.

For example, in FIG. 5B, the first state 520*a* of the website settings interface that corresponds to a first presentation setting (e.g., the media auto-play presentation setting) includes a representation for each of the open websites/tabs 506*a*, 506*b*, and 506*c* and a representation for a previously configured website (e.g., the URL 508*e*), and, in FIG. 5C, the second state 520*b* of the website settings interface that corresponds to the second presentation setting (e.g., the reader-mode presentation setting) includes a representation for each of the open websites/tabs 506*a*, 506*b*, and 506*c* and a representation for a previously configured website (e.g., the URL 508*f*)

It should be understood that the particular order in which the operations in FIGS. 7A-7C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 800 and 900) are also applicable in an analogous manner to method 700 described above with respect to FIGS. 7A-7C. For example, the presentation settings, local user preferences, aggregate user preferences, website representations, user-modifiable controls, and inputs described above with reference to method 700 optionally have one or more of the characteristics of the presentation settings, local user preferences, aggregate user preferences, website representations, user-modifiable controls, and inputs described herein with reference to other methods described herein (e.g., the methods 800 and 900). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 7A-7C, optionally, implemented by components depicted in FIGS. 1A-1B. For example, the inputs for closing websites, the inputs for opening websites, and the selection inputs for updating the second region of the website settings interface are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8D illustrate a flow diagram of a method 800 of presenting a website and associated media content according to determined presentation settings in accordance with some embodiments. The method 800 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the one or more input devices are on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 800 are, optionally, combined and/or the order of some operations is, optionally, changed.

As described below, the method 800 provides an intuitive way to present a website and associated media content according to determined presentation settings. The method reduces the cognitive burden on a user when presenting a website and associated media content according to determined presentation settings, thereby creating a more efficient human-machine interface. For battery-operated electronic devices, enabling a user to present a website and associated media content according to determined presentation settings faster and more efficiently conserves power and increases the time between battery charges.

Prior to presenting media content associated with a website (e.g., audio and/or visual content), the device determines (802) one or more presentation settings (e.g., a media auto-play presentation setting, a reader-mode presentation setting, a content blocker presentation setting, etc.) for presenting the media content based on a function of previous local user interaction data indicative of local user presentation preferences for the one or more presentation settings for the website (e.g., a setting manually configured by the user of the device within the web site settings interface, or the user's previous interaction(s) with the website) and aggregate user interaction data indicative of aggregate presentation preferences for the one or more presentation settings for the website (e.g., crowd-sourced data). According to some embodiments, determining the presentation settings based on a function of user preferences, aggregate preferences, and/or default preferences provides a seamless user experience that requires less time and user inputs when presenting websites and associated media content, which, additionally, reduces power usage and improves battery life of the device by enabling the user to use the device more quickly and efficiently.

In some embodiments, the device is associated multiple user/account profiles with separate user interaction data, and the presentation settings are determined based on a per-user/account basis according to the current web browser account being used. In some embodiments, the device is associated multiple user/account profiles with separate user interaction data, and the presentation settings are determined based on a per-user/account basis according to the current user/account logged into the device. In some embodiments, the presentation settings are determined based on a per-device basis where user interaction data is user/account agnostic.

As one example, the user interaction data corresponds to one or more presentation settings manually configured by the user of the device within the web site settings interface. As another example, the user interaction data corresponds to previous interactions the user of the device has had with the website (e.g., muting or pausing media content, allowing media content to run without muting or pausing, dismissing pop-ups, viewing the website in read-mode, and/or the like). For example, the aggregate user interaction data (e.g., crowd-sourced data) corresponds to previous interactions other users have had with the website (e.g., muting or pausing media content, allowing media content to run without muting or pausing, dismissing pop-ups, viewing the website in read-mode, and/or the like).

For example, with reference to FIG. 6A, when loading the URL 608 in response to a request to visit the URL 608, the device 100 determines whether to allow the media content 612 to auto-play or to prevent the media content 612 from auto-playing based on the preferences in the media auto-play presentation setting hierarchy 620. According to some embodiments, the value of the user preference 622a (e.g., a value previously configured/selected by a user of the device 100 for auto-playing media content associated with the URL 608) overrides the value of the aggregate preference 622b (e.g., a crowd-sourced value based on aggregate user expectations for auto-playing media content associated with the URL 608). According to some embodiments, the value of the aggregate preference 622b overrides the value of the default preference 622c (e.g., a predetermined backup value that has the option to be configured/selected by a user of the device 100 for the media auto-play presentation setting).

In some embodiments, the previous local user interaction data indicative of the local user presentation preferences for the one or more presentation settings for the website overrides (804) the aggregate user interaction data indicative of the aggregate presentation preferences for the one or more presentation settings for the website. For example, in FIG. 6A, the device 100 prevents the media content 612 from being auto-played (e.g., presented) within the web browser interface 602 due to the "deny" value for the user preference 622a for the media auto-play presentation setting for the URL 608 in the media auto-play presentation setting hierarchy 620. According to some embodiments, determining the presentation settings based on user preferences provides a seamless user-customized experience that requires less time and user inputs when presenting websites and associated media content, which, additionally, reduces power usage and improves battery life of the device by enabling the user to use the device more quickly and efficiently.

In some embodiments, the aggregate user interaction data indicative of the aggregate presentation preferences for the one or more presentation settings for the website overrides (806) one or more default presentation settings for the one or more presentation settings. For example, in FIG. 6B, the device 100 allows the media content 612 to be auto-played (e.g., presented) within the web browser interface 602 due to the user preference 622a not being set (e.g., NA) in the media auto-play presentation setting hierarchy 620 and due to the "allow" value for the aggregate preference 622b for the media auto-play presentation setting for the URL 608 in the media auto-play presentation setting hierarchy 620. According to some embodiments, determining the presentation settings based on aggregate preferences provides a seamless and intuitive experience that requires less time and user inputs when presenting websites and associated media content, which, additionally, reduces power usage and improves battery life of the device by enabling the user to use the device more quickly and efficiently.

In some embodiments, determining the one or more presentation settings for presenting the media content includes (808) determining the one or more presentation settings for presenting the media content in response to receiving a request to visit the website. In some embodiments, the media content is obtained in response to the request to visit the website (e.g., an HTTP GET request). In some embodiments, the request to visit the website corresponds to selection of a link associated with the website or a request to reload the website in a web browser application. According to some embodiments, determining the presentation settings based on a function of user preferences, aggregate preferences, and/or default preferences provides a seamless user experience that requires less time and user inputs when presenting websites and associated media content in response to a request to visit the website, which, additionally, reduces power usage and improves battery life of the device by enabling the user to use the device more quickly and efficiently.

In some embodiments, the device 100 maintains at least one of a user preference, aggregate preference, and default preference for one or more presentation settings for each of a plurality of web pages (or domains thereof). In some embodiments, a server that accessible by the device 100 maintains at least one of a user preference, aggregate preference, and default preference for one or more presentation settings for each of a plurality of web pages (or domains thereof). As one example, FIG. 6A shows the media auto-play presentation setting hierarchy 620 for the URL 608. Continuing with this example, similar hierarchies are maintained for other presentation settings for the URL 608. Continuing with this example, similar hierarchies for each of a plurality of presentation settings are maintained for other URLs. In some embodiments, in response to a request to visit a web page, the device 100 determines the presentation settings for the web page based on a function of a user preference, aggregate preference and default preference (e.g., the hierarchy discussed above) for each of the presentation settings and presents the web page (and associated media content) based on the determined presentation settings for the web page.

In some embodiments, determining the one or more presentation settings for presenting the media content includes (810) determining the one or more presentation settings for presenting the media content in response to obtaining the media content as an update associated with the website. As one example, while the device is displaying the website via a web browser application, the website pushes breaking news content or subsequent media content to the web browser application. In this example, the device determines presentation settings associated with the website before presenting the media content that was pushed to the web browser application. According to some embodiments, determining the presentation settings based on a function of user preferences, aggregate preferences, and/or default preferences provides a seamless user experience that requires less time and user inputs when presenting the media content in response to obtaining the media content (e.g., media content pushed to the web browser by a website), which, additionally, reduces power usage and improves battery life of the device by enabling the user to use the device more quickly and efficiently.

In some embodiments, the one or more presentation settings correspond to (812) one of a media auto-play setting, a reader mode setting, or a content blocker setting. According to some embodiments, determining the presentation settings (e.g., media auto-play, content blocker, and/or reader mode presentation settings) based on a function of user preferences, aggregate preferences, and/or default preferences provides a seamless user experience that requires less time and user inputs when presenting websites and associated media content, which, additionally, reduces power usage and improves battery life of the device by enabling the user to use the device more quickly and efficiently.

In some embodiments, the aggregate user interaction data for the website includes (814) one or more positive signals related to the one or more presentation settings for presenting the media content from other users. In some embodiments, an aggregate preference for a presentation setting for a website is based on aggregate interaction data that includes a plurality of positive signals associated with the presentation setting for the website and/or negative signals associated with the presentation setting for the website. According to some embodiments, generating an aggregate preferences for a respective presentation setting for a website based on aggregate user interaction data that includes positive signals and/or negative signals provides a seamless and intuitive experience that requires less time and user inputs when presenting the website and associated media content, which, additionally, reduces power usage and improves battery life of the device by enabling the user to use the device more quickly and efficiently.

For example, a server that accessible by the device 100 collects the aggregate user interaction data (e.g., including positive signals) and generates aggregate preferences based thereon. In some embodiments, the aggregate user interaction data is anonymized. For example, a respective positive signal corresponds to a user allowing media content to auto-play without muting the media content. In another example, a respective positive signal corresponds to a user allowing media content to auto-play without pausing the media content. In yet another example, a respective positive signal corresponds to a user requesting play back of media content (e.g., not marked to auto-play) within X seconds of loading a web page.

In some embodiments, an aggregate preference for a presentation setting for a website is available if there is at least a threshold amount of aggregate user interaction data associated with the presentation setting for the website. In some embodiments, an aggregate preference for a presentation setting for a website is available if there the aggregate user interaction data associated with the presentation setting for the website indicates consensus for a value for the presentation setting (e.g., 75%+ support for one state of the web browsing setting). In some embodiments, an aggregate preference for a presentation setting for a website is subject to change over time based on new aggregate user interaction data.

In some embodiments, a respective one of the one or more presentation settings corresponds to (816) a media auto-play setting for media content, and the aggregate user interaction data includes data indicating how frequently users started playing content on the website within a predetermined amount of time of loading the website. For example, a server accessible by the device 100 collects the aggregate user interaction data (e.g., including positive signals associated with playing media content) associated with a media auto-play presentation setting for the website and generates an aggregate preference for the media auto-play presentation setting for the website based thereon.

In some embodiments, the aggregate user interaction data for the website includes (818) one or more negative signals related to the one or more presentation settings for presenting the media content from other users. According to some embodiments, generating an aggregate preferences for a respective presentation setting for a website based on aggregate user interaction data that includes positive signals and/or negative signals provides a seamless and intuitive experience that requires less time and user inputs when presenting the website and associated media content, which, additionally, reduces power usage and improves battery life of the device by enabling the user to use the device more quickly and efficiently.

For example, a server that accessible by the device 100 collects the aggregate user interaction data (e.g., including negative signals) and generates aggregate preferences based thereon. In some embodiments, an aggregate preference for a presentation setting for a website is based on aggregate interaction data that includes a plurality of positive signals associated with the presentation setting for the website and/or negative signals associated with the presentation setting for the website. In some embodiments, the aggregate user interaction data is anonymized. For example, a respective negative signal corresponds to a user pausing/stopping media content within Y seconds of loading a web page. In another example, a respective negative signal corresponds to a user muting media content within Z seconds of loading a web page. In another example, a respective negative signal corresponds to a user closing or navigating away from a tab associated with a web page within T seconds of loading the web page.

In some embodiments, a respective one of the one or more presentation settings corresponds to (820) a media auto-play setting for media content, and the aggregate user interaction data includes data indicating how frequently users paused auto-playing content within a predetermined amount of time of loading the website. For example, a server accessible by the device 100 collects the aggregate user interaction data (e.g., including negative signals associated with pausing auto-played media content) associated with a media auto-play presentation setting for the website and generates an aggregate preference for the media auto-play presentation setting for the website based thereon.

The device display (822), on the display, the website and presenting the media content based on the determination of the one or more presentation settings. In some embodiments, the device 100 determines the presentation settings for the web page based on a function of a user preference associated with the user interaction data, aggregate preference associated with the aggregate interaction data, and default preference for each of the presentation settings (e.g., the media auto-play, content blocker, and/or reader mode presentation settings) and presents the web page (and associated media content) based on the determined presentation settings for the web page. In some embodiments, the user preference associated with the previous local user interaction data overrides the aggregate preference associated with the aggregate user interaction data. In some embodiments, the aggregate preference associated with the aggregate user interaction data overrides the default preference. According to some embodiments, presenting websites and associated media content according to the presentation settings determined based on a function of user preferences, aggregate preferences, and/or default preferences for the presentation settings provides a seamless user experience that requires less time and user inputs, which, additionally, reduces power usage and improves battery life of the device by enabling the user to use the device more quickly and efficiently.

As one example, in FIG. 6A, the device 100 prevents the media content 612 from being auto-played (e.g., presented) within the web browser interface 602 due to the "deny" value for the user preference 622a for the media auto-play presentation setting for the URL 608 in the media auto-play presentation setting hierarchy 620. As another example, in FIG. 6B, the device 100 allows the media content 612 to be auto-played (e.g., presented) within the web browser interface 602 due to the user preference 622a not being set (e.g., NA) in the media auto-play presentation setting hierarchy 620 and due to the "allow" value for the aggregate preference 622b for the media auto-play presentation setting for the URL 608 in the media auto-play presentation setting hierarchy 620. As yet another example, in FIG. 6C, the device 100 prevents the media content 612 from being auto-played (e.g., presented) within the web browser interface 602 due to the user preference 622a not being set (e.g., NA) in the media auto-play presentation setting hierarchy 620, due to the aggregate preference 622b not being set (e.g., NA) in the media auto-play presentation setting hierarchy 620, and due to the "deny" value for the default preference 622c for the media auto-play presentation setting in the media auto-play presentation setting hierarchy 620.

In some embodiments, presenting the media content based on the determination of the one or more presentation settings includes (824): in accordance with a determination that the media content is auto-playing media content (e.g., the media content is marked by the website to auto-play) and that the function of the previous local user interaction data indicative of the local user presentation preferences for the one or more presentation settings for the web site and the aggregate user interaction data indicative of the aggregate presentation preferences for the one or more presentation settings for the website indicates a preference for allowing auto-play of the media content, auto-playing the media content; and, in accordance with a determination that the media content is auto-playing media content (e.g., the media content is marked by the website to auto-play) and that the function of the previous local user interaction data indicative of the local user presentation preferences for the one or more presentation settings for the website and the aggregate user interaction data indicative of the aggregate presentation preferences for the one or more presentation settings for the website indicates a preference for preventing auto-play of the media content, forgoing auto-playing the media content. According to some embodiments, presenting media content according to the media-auto play presentation setting determined based on a function of user preferences, aggregate preferences, and/or default preferences for the media-auto play presentation setting provides a seamless user experience that requires less time and user inputs, which, additionally, reduces power usage and improves battery life of the device by enabling the user to use the device more quickly and efficiently.

In some embodiments, the device auto-plays the media content when the website is loaded. In some embodiments, the device auto-plays the media content when the media content is pushed to the device. In some embodiments, the device forgoes auto-playing the media content when the website is loaded. In some embodiments, the device forgoes auto-playing the media content when the media content is pushed to the device. For example, forgoing auto-playing the media content includes muting the audio portion of the media content and presenting the video portion of the media content. In another example, forgoing auto-playing the media content includes preventing the media content from auto-playing. In another example, forgoing auto-playing the media content includes playing the audio portion of the media content and preventing presentation of the video portion of the media content.

In some embodiments, presenting the media content based on the determination of the one or more presentation settings includes (826): in accordance with a determination that the media content is not marked by the website as auto-playing media content and that the function of the previous local user interaction data indicative of the local user presentation preferences for the one or more presentation settings for the website and the aggregate user interaction data indicative of the aggregate presentation preferences for the one or more presentation settings for the website indicates a preference for playing the media content, auto-playing the media content; and, in accordance with a determination that the media content is not marked by the website as auto-playing media content and that the function of the previous local user interaction data indicative of the local user presentation preferences for the one or more presentation settings for the website and the aggregate user interaction data indicative of the aggregate presentation preferences for the one or more presentation settings for the website indicates a preference for not playing the media content, forgoing auto-playing the media content. According to some embodiments, presenting media content according to the media-auto play presentation setting determined based on a function of user preferences, aggregate preferences, and/or default preferences for the media-auto play presentation setting provides a seamless user experience that requires less time and user inputs, which, additionally, reduces power usage and improves battery life of the device by enabling the user to use the device more quickly and efficiently.

In some embodiments, the device auto-plays the media content when the website is loaded. In some embodiments, the device auto-plays the media content when the media content is pushed to the device. In some embodiments, the device forgoes auto-playing the media content when the website is loaded. In some embodiments, the device forgoes auto-playing the media content when the media content is pushed to the device. For example, in accordance with a determination that a function of the user preference associated with the user interaction data and the aggregate preference associated with the aggregate user interaction data for the website indicates a preference for auto-playing the media content associated with a website, the device auto-plays the media content when loading the website even if the media content is not marked by the website to auto-play.

In some embodiments, presenting the media content based on the determination of the one or more presentation settings includes (828): in accordance with a determination that the function of the previous local user interaction data indicative of the local user presentation preferences for the one or more presentation settings for the website and the aggregate user interaction data indicative of the aggregate presentation preferences for the one or more presentation settings for the website indicates a preference for presenting the web site in a reader-mode that excludes some content of the web site, presenting the website and the media content in reader-mode; and, in accordance with a determination that the function of the previous local user interaction data indicative of the local user presentation preferences for the one or more presentation settings for the website and the aggregate user interaction data indicative of the aggregate presentation preferences for the one or more presentation settings for the website indicates a preference for presenting the website in a normal presentation mode that includes additional content of the web site not included in the reader-mode, presenting the website and the media content in the normal presentation mode. According to some embodiments, presenting a website and associated media content according to the reader-mode presentation setting determined based on a function of user preferences, aggregate preferences, and/or default preferences for the reader-mode presentation setting provides a seamless user experience that requires less time and user inputs, which, additionally, reduces power usage and improves battery life of the device by enabling the user to use the device more quickly and efficiently.

According to some embodiments, if the website corresponds to a multi-page article or multi-page content, the device displays the multi-page article as a single web page in the reader-mode by fetching the multiple pages of the multi-page article and merging them into a single continuous web page. According to some embodiments, the device removes background images and extraneous content (e.g., advertisements) from the website when displaying the website in the reader-mode. According to some embodiments, the device normalizes the text size, font, etc. of the web site content when displaying the web site in the reader-mode. In some embodiments, the device 100 determines the presentation settings for the web page based on a function of a user preference associated with the user interaction data, an aggregate preference associated with the aggregate interaction data, and a default preference for each of the presentation settings (e.g., media auto-play, content blocker, reader mode, and/or the like) and presents the web page (and associated media content) based on the determined presentation settings for the web page.

In some embodiments, presenting the media content based on the determination of the one or more presentation settings includes (830): in accordance with a determination that the function of the previous local user interaction data indicative of the local user presentation preferences for the one or more presentation settings for the website and the aggregate user interaction data indicative of the aggregate presentation preferences for the one or more presentation settings for the website indicates a preference for blocking content associated with the website that satisfies predetermined criteria, presenting the website and the media content while blocking the content that satisfies the predetermined criteria; and, in accordance with a determination that the function of the previous local user interaction data indicative of the local user presentation preferences for the one or more presentation settings for the web site and the aggregate user interaction data indicative of the aggregate presentation preferences for the one or more presentation settings for the website indicates a preference for not blocking the content associated with the website that satisfies the predetermined criteria, presenting the website and the media content without blocking the content that satisfies the predetermined criteria. According to some embodiments, presenting a website and associated media content according to the content blocker presentation setting determined based on a function of user preferences, aggregate preferences, and/or default preferences for the content blocker presentation setting provides a seamless user experience that requires less time and user inputs, which, additionally, reduces power usage and improves battery life of the device by enabling the user to use the device more quickly and efficiently.

According to some embodiments, content that satisfies the predetermined criteria includes pop-up advertisements, pop-under advertisements, banner advertisements, in-line advertisements, scroll-through advertisements, advertisements associated with media content (e.g., advertisements in Flash video), and/or the like. In some embodiments, the device 100 determines the presentation settings for the web page based on a function of a user preference associated with the user interaction data, an aggregate preference associated with the aggregate interaction data, and a default preference for each of the presentation settings (e.g., media auto-play, content blocker, reader mode, and/or the like) and presents the web page (and associated media content) based on the determined presentation settings for the web page.

In some embodiments, the device (832): while displaying, on the display, the website (e.g., within the web browser application), detects, via the one or more input devices, an input that corresponds to previewing values for the one or more presentation settings for the website (e.g., long press on the address bar while the first website is displayed within the web browser); and, in response to detecting the input, displaying, on the display, a presentation settings preview interface (e.g., a pop-up pane/panel overlaid on the content that corresponds to the first website), where presentation settings preview interface includes values for the one or more presentation settings for the website. According to some embodiments, the presentation settings preview interface provides a seamless user experience that requires less time and user inputs when viewing and modifying presentation settings for a currently displayed website, which, additionally, reduces power usage and improves battery life of the device by enabling the user to use the device more quickly and efficiently.

In some embodiments, the presentation settings preview interface includes at least some of reader-mode setting, a content block setting, a media auto-play setting, or a page zoom setting. For example, the presentation settings preview interface includes the current state for the first presentation setting for the first website, and (optionally) the current state of one or more others presentation settings for the first website. In some embodiments, the first value for the first presentation setting for the first website is user-modifiable (e.g., the first presentation setting is associated with a radio button or toggle to change the first value for the first presentation setting).

For example, FIGS. 5O-5Q show a sequence in which a presentation settings preview interface 570 is displayed over the web browser interface 502. As shown in FIG. 5Q, the presentation settings preview interface 570 includes: a first toggle affordance 572*a* provided to view the current value of the reader-mode presentation setting for the currently displayed web page (e.g., the URL 508*c*) and to toggle said current value in response to selection thereof (e.g., with a contact); a second toggle affordance 572*b* provided to view the current value of the content blocker presentation setting for the currently displayed web page (e.g., the URL 508*c*) and to toggle said current value in response to selection thereof; and a third toggle affordance 572*c* provided to view the current value of the media auto-play presentation setting for the currently displayed web page (e.g., the URL 508*c*) and to toggle said current value in response to selection thereof.

It should be understood that the particular order in which the operations in FIGS. 8A-8D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 700 and 900) are also applicable in an analogous manner to method 800 described above with respect to FIGS. 8A-8D. For example, the presentation settings, local user preferences, and aggregate user preferences described above with reference to method 800 optionally have one or more of the characteristics of the presentation settings, local user preferences, and aggregate user preferences described herein with reference to other methods described herein (e.g., the methods 700 and 900). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 8A-8C, optionally, implemented by components depicted in FIGS. 1A-1B. For example, the inputs are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 9 illustrates a flow diagram of a method 900 of auto-playing media content according to aggregate user expectations in accordance with some embodiments. The method 900 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the one or more input devices are on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 900 are, optionally, combined and/or the order of some operations is, optionally, changed.

As described below, the method 900 provides an intuitive way to auto-play media content according to aggregate user expectations. The method reduces the cognitive burden on a user when auto-playing media content according to aggregate user expectations, thereby creating a more efficient human-machine interface. For battery-operated electronic devices, enabling a user to auto-play media content according to aggregate user expectations faster and more efficiently conserves power and increases the time between battery charges.

The device receives (902) a request to display a website on the display, where the website includes media content. In some embodiments, the request corresponds to a request to visit the website (e.g., an HTTP GET request). In some embodiments, the request corresponds to a request to selection of a link associated with the website or a request to reload the website in a web browser application.

In response to the request, and in accordance with a determination that the media content is marked by the website as auto-playing media content and that aggregate user interaction data for the website indicates that allowing media to auto-play on the website is consistent with aggregate user expectations, the device auto-plays (904) the media content. In some embodiments, in accordance with a determination that the media content is marked by the website as auto-playing media content, the device 100 determines the aggregate user expectation (e.g., allow media content to auto-play) for auto-playing media content associated with the website based on an aggregate media auto-play preference for the website associated with the aggregate interaction data and allows the media content to auto-play based on the determined aggregate user expectation for auto-playing media content associated with the website. According to some embodiments, presenting media content according to the media-auto play presentation setting determined based on the aggregate user expectations for the media-auto play presentation setting provides a seamless user experience that requires less time and user inputs, which, additionally, reduces power usage and improves battery life of the device by enabling the user to use the device more quickly and efficiently.

In response to the request, and in accordance with a determination that the media content is marked by the website as auto-playing media content and that the aggregate user interaction data for the website indicates that allowing media to auto-play on the website is not consistent with aggregate user expectations, the device forgoes (906) auto-playing the media content. In some embodiments, in accordance with a determination that the media content is marked by the website as auto-playing media content, the device 100 determines the aggregate user expectation (e.g., prevent media content from auto-playing) for auto-playing media content associated with the website based on an aggregate media auto-play preference for the website associated with the aggregate interaction data and prevents the media content from auto-playing based on the determined aggregate user expectation for auto-playing media content associated with the website. According to some embodiments, presenting media content according to the media-auto play presentation setting determined based on the aggregate user expectations for the media-auto play presentation setting provides a seamless user experience that requires less time and user inputs, which, additionally, reduces power usage and improves battery life of the device by enabling the user to use the device more quickly and efficiently.

In some embodiments, in response to the request, and in accordance with a determination that the media content is not marked by the website as auto-playing media content and that aggregate user interaction data for the website indicates that allowing media to auto-play on the website is consistent with aggregate user expectations, the device auto-plays (908) the media content in response to the request. In some embodiments, in accordance with a determination that the media content is not marked by the website as auto-playing media content, the device 100 determines the aggregate user expectation (e.g., allow media content to auto-play) for auto-playing media content associated with the website based on an aggregate media auto-play preference for the website associated with the aggregate interaction data and allows the media content to auto-play based on the determined aggregate user expectation for auto-playing media content associated with the website. According to some embodiments, presenting media content according to the media-auto play presentation setting determined based on the aggregate user expectations for the media-auto play presentation setting provides a seamless user experience that requires less time and user inputs, which, additionally, reduces power usage and improves battery life of the device by enabling the user to use the device more quickly and efficiently.

In some embodiments, in response to the request, and in accordance with a determination that the media content is not marked by the website as auto-playing media content and that the aggregate user interaction data for the web site indicates that allowing media to auto-play on the website is not consistent with aggregate user expectations, the device forgoes (910) auto-playing the media content. In some embodiments, in accordance with a determination that the media content is not marked by the website as auto-playing media content, the device 100 determines the aggregate user expectation (e.g., prevent media content from auto-playing) for auto-playing media content associated with the website based on an aggregate media auto-play preference for the website associated with the aggregate interaction data and prevents the media content from auto-playing based on the determined aggregate user expectation for auto-playing media content associated with the website. According to some embodiments, presenting media content according to the media-auto play presentation setting determined based on the aggregate user expectations for the media-auto play presentation setting provides a seamless user experience that requires less time and user inputs, which, additionally, reduces power usage and improves battery life of the device by enabling the user to use the device more quickly and efficiently.

It should be understood that the particular order in which the operations in FIG. 9 has been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods 700 and 800) are also applicable in an analogous manner to method 900 described above with respect to FIG. 9. For example, the aggregate user expectations and media content described above with reference to method 900 optionally have one or more of the characteristics of the aggregate user expectations and media content described herein with reference to other methods described herein (e.g., the methods 700 and 800). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIG. 9, optionally, implemented by components depicted in FIGS. 1A-1B. For example, the inputs are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with one or more processors, non-transitory memory, a display, and one or more input devices:
      while displaying a plurality of tabs respectively associated with a plurality of websites and a website of the plurality of websites and in response to detecting a user input to display a website settings interface, displaying, on the display over at least a portion of the website of the plurality of websites, the website settings interface provided to edit a plurality of a presentation settings for at least one website of the plurality of websites, including concurrently displaying;
         a first indicator of a first website of the plurality of websites and a first user-modifiable control for selecting a first value for a first presentation setting for the first website; and
         a second indicator of a second website of the plurality of websites and a second user-modifiable control for selecting a second value for the first presentation setting for the second website, wherein the second value for the first presentation setting for the second website is not associated with a previously received user preference and the second value for the first presentation setting for the second website is set according to a predetermined value for the first presentation setting; and after detecting a user input that ceases display of a tab associated with the second website, displaying, on the display, the website settings interface, wherein the website settings interface includes the first indicator of the first website and does not include the second indicator of the second website.

2. The method of claim 1, wherein displaying the website settings interface further comprises displaying a third indicator of a third website not corresponding to one of the plurality of websites and a third user-modifiable control for selecting a third value for the first presentation setting for the third website, wherein the third value for the first presentation setting for the third website is set according to a value configured by a user of the device.

3. The method of claim 2, wherein the third value for the first presentation setting for the third website is different from the predetermined value for the first presentation setting for the second website.

4. The method of claim 1, further comprising:
after detecting a user input that ceases display of a tab associated with the first website, displaying, on the display, the website settings interface, wherein:
in accordance with a determination that the first presentation setting for the first website has been configured by a user of the device and the first value for the first presentation setting for the first website is set according to a value configured by the user of the device, displaying the website setting interface includes displaying the first indicator of the first website; and
in accordance with a determination that the first presentation setting for the first website has not been configured by the user of the device and the first value for the first presentation setting for the first website is set according to the predetermined value for the first presentation setting, displaying the website setting interface does not include displaying the first indicator of the first website.

5. The method of claim 1, further comprising:
after detecting a user input that causes display of a tab associated with a third website that does not correspond to one of the plurality of websites, displaying, on the display, the website settings interface, wherein the website settings interface includes:
the first indicator of the first website; and
a third indicator of the third website and a third user-modifiable control for selecting a third value for the first presentation setting for the third website.

6. The method of claim 1, wherein the website settings interface includes:
a first region with a plurality of presentation setting affordances provided to edit different presentation settings for the at least one website of the plurality of websites, wherein a first presentation setting affordance associated with the first presentation setting is currently selected; and
a second region that includes:
the first indicator of the first website and the user-modifiable control for selecting the first value for the first presentation setting for the first website; and
the second indicator of the second website and the user-modifiable control for selecting the second value for the first presentation setting for the second website.

7. The method of claim 6, further comprising:
detecting, via the one or more input devices, a selection user input that corresponds to selection of a second presentation setting affordance associated with a second presentation setting within the first region; and
in response to detecting the selection user input, updating the second region to concurrently display:
the first indicator of the first website and a third user-modifiable control for selecting a first value for the second presentation setting for the first website; and
the second indicator of the second website and a fourth user-modifiable control for selecting a second value for the second presentation setting for the second website.

8. The method of claim 7, wherein, prior to detecting the selection user input, the website setting interface includes a third indicator of a third website and a fifth user-modifiable control for changing a third value for the first presentation setting for the third website, wherein the third value is set according to a value configured by a user of the device, and
wherein, after detecting the selection user input, the website setting interface does not include a third indicator of the third website.

9. The method of claim 1, wherein the website settings interface further includes an additional user-modifiable control for selecting the predetermined value for the first presentation setting.

10. The method of claim 1, wherein the website settings interface further includes a removal affordance for removing a configured value for the first presentation setting for a website.

11. The method of claim 1, further comprising:
while displaying, on the display, the first website, detecting, via the one or more input devices, a preview user input that corresponds to previewing the first value for the first presentation setting for the first website; and
in response to detecting the preview user input, displaying, on the display, a presentation settings preview interface, wherein the presentation settings preview interface at least includes the first value for the first presentation setting for the first website.

12. An electronic device, comprising:
a display;
one or more input devices;
one or more processors;
non-transitory memory; and
one or more programs, wherein the one or more programs are stored in the non-transitory memory and configured to be executed by the one or more processors, the one or more programs including instructions for:
while displaying a plurality of tabs respectively associated with a plurality of websites and a website of the plurality of the websites and in response to detecting a user input to display a website settings interface, displaying, on the display over at least a portion of the website of the plurality of websites, the website settings interface provided to edit a plurality of a presentation settings for at least one website of the plurality of websites, including concurrently displaying;
a first indicator of a first website of the plurality of websites and a user-modifiable control for selecting a first value for a first presentation setting for the first website; and
a second indicator of a second website of the plurality of websites and a user-modifiable control for selecting a second value for the first presentation setting for the second website, wherein the second value for the first presentation setting for the second website is not associated with a previously received user preference and the second value for the first presentation setting for the second website is set according to a predetermined value for the first presentation setting; and after detecting a user input that ceases display of a tab associated with the second website, displaying, on the display, the website settings interface, wherein the website settings interface includes the first indicator of the first website and does not include the second indicator of the second website.

13. The electronic device of claim 12, wherein displaying the website settings interface further comprises displaying a third indicator of a third website not corresponding to one of the plurality of websites and a third user-modifiable control for selecting a third value for the first presentation setting for the third website, wherein the third value for the first presentation setting for the third website is set according to a value configured by a user of the device.

14. The electronic device of claim 13, wherein the third value for the first presentation setting for the third website is different from the predetermined value for the first presentation setting for the second website.

15. The electronic device of claim 12, wherein the one or more programs further include instructions for:

after detecting a user input that ceases display of a tab associated with the first website, displaying, on the display, the website settings interface, wherein:
in accordance with a determination that the first presentation setting for the first website has been configured by a user of the device and the first value for the first presentation setting for the first website is set according to a value configured by the user of the device, displaying the website setting interface includes displaying the first indicator of the first website; and
in accordance with a determination that the first presentation setting for the first website has not been configured by the user of the device and the first value for the first presentation setting for the first website is set according to the predetermined value for the first presentation setting, displaying the website setting interface does not include displaying the first indicator of the first website.

16. The electronic device of claim 12, wherein the one or more programs further include instructions for:

after detecting a user input that causes display of a tab associated with a third website that does not correspond to one of the plurality of websites, displaying, on the display, the website settings interface, wherein the website settings interface includes:
the first indicator of the first website; and
a third indicator of the third website and a third user-modifiable control for selecting a third value for the first presentation setting for the third website.

17. The electronic device of claim 12, wherein the website settings interface includes:

a first region with a plurality of presentation setting affordances provided to edit different presentation settings for the at least one website of the plurality of websites, wherein a first presentation setting affordance associated with the first presentation setting is currently selected; and a second region that includes:
the first indicator of the first website and the user-modifiable control for selecting the first value for the first presentation setting for the first website; and the second indicator of the second website and the user-modifiable control for selecting the second value for the first presentation setting for the second website.

18. The electronic device of claim 17, wherein the one or more programs further include instructions for:

detecting, via the one or more input devices, a selection user input that corresponds to selection of a second presentation setting affordance associated with a second presentation setting within the first region; and in response to detecting the selection user input, updating the second region to concurrently display:
the first indicator of the first website and a third user-modifiable control for selecting a first value for the second presentation setting for the first website; and
the second indicator of the second website and a fourth user-modifiable control for selecting a second value for the second presentation setting for the second website.

19. The electronic device of claim 18, wherein, prior to detecting the selection user input, the website setting interface includes a third indicator of a third website and a fifth user-modifiable control for changing a third value for the first presentation setting for the third website, wherein the third value is set according to a value configured by a user of the device, and wherein, after detecting the selection user input, the website setting interface does not include a third indicator of the third website.

20. A non-transitory computer readable storage medium storing one or more programs, the one or more programs comprising instructions, which, when executed by an electronic device with a display and one or more input devices, cause the electronic device to:

while displaying a plurality of tabs respective associated with a plurality of websites and a website of the plurality of websites and in response to detecting a user input to display a website settings interface, display, on the display over at least a portion of the website of the plurality of websites, the website settings interface provided to edit a plurality of a presentation settings for at least one website of the plurality of websites, including concurrently displaying;
a first indicator of a first website of the plurality of websites and a first user-modifiable control for selecting a first value for a first presentation setting for the first website; and
a second indicator of a second website of the plurality of websites and a user-modifiable control for selecting a second value for the first presentation setting for the second website, wherein the second value for the first presentation setting for the second website is not associated with a previously received user preference and the second value for the first presentation setting for the second website is set according to a predetermined value for the first presentation setting; and after detecting a user input that ceases display of at tab associated with the second website, display, on the display, the website settings interface, wherein the website settings interface includes the first indicator of the first website and does not include the second indicator of the second website.

* * * * *